(12) United States Patent
Cao et al.

(10) Patent No.: US 11,575,551 B2
(45) Date of Patent: Feb. 7, 2023

(54) PARALLEL TRANSMISSION OF PREAMBLE SEQUENCES WITH DATA LAYERS FOR IMPROVED DATA DETECTION

(71) Applicant: Qualcomm Incorporated, San Diego, CA (US)

(72) Inventors: Yiqing Cao, Beijing (CN); Wanshi Chen, San Diego, CA (US); Jing Lei, San Diego, CA (US); Renqiu Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 17/040,596

(22) PCT Filed: Mar. 25, 2019

(86) PCT No.: PCT/CN2019/079460
§ 371 (c)(1),
(2) Date: Sep. 23, 2020

(87) PCT Pub. No.: WO2019/192340
PCT Pub. Date: Oct. 10, 2019

(65) Prior Publication Data
US 2021/0076381 A1   Mar. 11, 2021

(30) Foreign Application Priority Data
Apr. 2, 2018   (WO) ............... PCT/CN2018/081542

(51) Int. Cl.
*H04W 72/04*   (2009.01)
*H04L 27/26*   (2006.01)
(Continued)

(52) U.S. Cl.
CPC ........ *H04L 27/2602* (2013.01); *H04L 5/0048* (2013.01); *H04L 25/0202* (2013.01);
(Continued)

(58) Field of Classification Search
CPC ........... H04L 25/03866; H04L 27/2602; H04L 25/0202; H04L 5/0048; H04L 27/261;
(Continued)

(56) References Cited

U.S. PATENT DOCUMENTS 6,307,851 B1 * 10/2001 Jung .................... H04L 1/06
 370/335
9,648,641 B2 * 5/2017 Sun ................ H04L 27/26416
(Continued)

FOREIGN PATENT DOCUMENTS

CN       101094506 A     12/2007
CN       101242671 A      8/2008
(Continued)

OTHER PUBLICATIONS

Intel Corporation: "NOMA related procedure", 3GPP TSG RAN WG1 Meeting #92, R1-1802427, Athens, Greece, Mar. 2, 2018, pp. 1-8, Section 2, 3, 5.
(Continued)

*Primary Examiner* — Man U Phan
(74) *Attorney, Agent, or Firm* — Holland & Hart LLP

(57) ABSTRACT

Methods, systems, and devices for wireless communications are described. In some systems (e.g., non-orthogonal multiple access (NOMA) systems), a base station may serve a large number of user equipments (UEs) on the uplink. To improve detectability for these uplink transmissions (e.g., if reference signals are not available for the transmissions), the UEs may implement parallel transmissions of preambles with uplink data. A UE may split the uplink data into one or more data layers, and may select one or more preamble layers to transmit superposed with the data layers. These preambles may be sequences known to both the UE and the base station to aid in detectability. The UE may assign different signature sequences to each of these layers based (Continued)

on cross-correlation values (e.g., assigning sequences with higher cross-correlation values to the data layers for improved detectability), and may scramble the layers into a single shared signal for transmission.

28 Claims, 18 Drawing Sheets

(51) Int. Cl.
    *H04L 5/00*         (2006.01)
    *H04L 25/02*       (2006.01)
    *H04W 72/044*    (2023.01)

(52) U.S. Cl.
    CPC ....... *H04W 72/0466* (2013.01); *H04L 27/261* (2013.01); *H04L 27/26025* (2021.01)

(58) Field of Classification Search
    CPC . H04L 27/2626; H04L 27/26025; H04L 5/00; H04L 27/26; H04L 25/02; H04W 72/0466; H04W 72/04
    USPC .......................................................... 370/329
    See application file for complete search history.

(56) References Cited

U.S. PATENT DOCUMENTS

| | | | |
|---|---|---|---|
| 10,104,631 B2 * | 10/2018 | Lee | H04W 56/005 |
| 10,721,114 B2 * | 7/2020 | Herath | H04W 72/04 |
| 2014/0133395 A1 | 5/2014 | Nam et al. | |
| 2020/0186189 A1 * | 6/2020 | Herath | H04B 1/7143 |
| 2020/0322994 A1 * | 10/2020 | Tian | H04W 76/27 |
| 2021/0036904 A1 | 2/2021 | Wu et al. | |
| 2021/0068111 A1 * | 3/2021 | Cao | H04W 76/27 |
| 2021/0068163 A1 * | 3/2021 | Lee | H04W 74/0833 |
| 2021/0105079 A1 * | 4/2021 | Lei | H04L 27/2602 |
| 2021/0266045 A1 * | 8/2021 | Reial | H04B 7/0452 |
| 2021/0289559 A1 * | 9/2021 | Sakhnini | H04L 27/2662 |
| 2021/0306191 A1 * | 9/2021 | Lin | H04L 1/0071 |
| 2022/0006572 A1 * | 1/2022 | Lin | H04L 1/1864 |

FOREIGN PATENT DOCUMENTS

| | | |
|---|---|---|
| CN | 105359446 A | 2/2016 |
| CN | 106455113 A | 2/2017 |
| CN | 106559874 A | 4/2017 |
| WO | WO-2009023670 A2 | 2/2009 |
| WO | WO-2018031620 A1 | 2/2018 |

OTHER PUBLICATIONS

International Search Report and Written Opinion—PCT/CN2018/081542—ISA/EPO—dated Jan. 10, 2019 (182564WO1).
International Search Report and Written Opinion—PCT/CN2019/079460—ISA/EPO—dated May 29, 2019 (182564WO2).
Zte et al., "Transmitter side processing schemes for NOMA", 3GPP TSG RAN WG1 Meeting #92, R1-1801415, Athens, Greece, Mar. 2, 2018, pp. 1-6, Section 2.
ETRI: "LLS Results for UL Low-Rate Code and Signature Based Shared Access Scheme", 3GPP TSG-RAN1#86, 3GPP Draft, R1-167340, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 22, 2016-Aug. 26, 2016, Aug. 21, 2016 (Aug. 21, 2016), 6 Pages, XP051125853, Retrieved from the Internet: URL: http://www.3gpp.org/ftp/Meetings_3GPP_SYNC/RAN1/Docs/, [retrieved on Aug. 21, 2016], Section 3.1, figure 2.
Supplementary European Search Report—EP19781253—Search Authority—Munich—dated Dec. 3, 2021 (182564EP).

* cited by examiner

PARALLEL TRANSMISSION OF PREAMBLE SEQUENCES WITH DATA LAYERS FOR IMPROVED DATA DETECTION

CROSS REFERENCES

The present application is a 371 national phase filing of International Patent Application No. PCT/CN2019/079460 by CAO, et al., entitled "PARALLEL TRANSMISSION OF PREAMBLE SEQUENCES WITH DATA LAYERS FOR IMPROVED DATA DETECTION," filed Mar. 25, 2019; and to International Application No. PCT/CN2018/081542 by CAO, et al., entitled "PARALLEL TRANSMISSION OF PREAMBLE SEQUENCES WITH DATA LAYERS FOR IMPROVED DATA DETECTION," filed Apr. 2, 2018, each of which is assigned to the assignee hereof and each of which is hereby incorporated by reference in its entirety.

BACKGROUND

The following relates generally to wireless communications, and more specifically to parallel transmission of preamble sequences with data layers for improved data detection.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communication systems (e.g., non-orthogonal multiple access (NOMA) systems) may support a large number of UEs transmitting data on the uplink connection using non-orthogonal signature sequences. The wireless communications systems, however, may support a much smaller number of reference signals (e.g., demodulation reference signals (DMRSs)) for transmission with this uplink data. For example, the wireless communications systems may support between four and twelve DMRSs within a slot, but may support many (e.g., hundreds or even thousands) of uplink data transmissions using short or long signature sequence designs during this time frame. In these cases, the limited number of DMRSs may result in a bottleneck of uplink transmission capabilities in a NOMA system, which may lead to inefficiencies and less effective communication.

SUMMARY

The described techniques relate to improved methods, systems, devices, or apparatuses that support parallel transmission of preamble sequences with data layers for improved data detection. Generally, the described techniques provide for supporting data detectability at a base station in a non-orthogonal multiple access (NOMA) system (e.g., a massive NOMA system). A base station in a NOMA system may serve a large number of user equipments (UEs) on the uplink during a same time period (e.g., a slot), but may support a much smaller number of uplink reference signals.

To improve detectability for uplink transmissions (e.g., if reference signals are not available for the transmissions, for redundancy when reference signals are available), the UEs may implement parallel transmissions of some information (e.g., preambles) with uplink data. A UE may split the uplink data into one or more data layers, and may select one or more information layers, such as preamble layers, to transmit superposed with the one or more data layers. These preambles may, in some cases, be sequences or values known to at least one of, if not both of, the UE or the base station. The UE may assign different signature sequences to each of these layers based on some information, which may include one or more cross-correlation values (e.g., assigning sequences with higher cross-correlation values to the data layers for improved detectability), and may scramble the layers into a single shared signal for transmission. A base station receiving the signal may decode the data based on the other information (e.g., the preambles). For example, the base station may perform channel estimation using the preamble information, or may use the preamble information as prior information inputs in a message-passing procedure.

A method of wireless communications is described. The method may include identifying one or more data layers and one or more preamble layers for transmission, determining a set of signature sequences for scrambling the one or more data layers and the one or more preamble layers, assigning each signature sequence of the set of signature sequences to a data layer of the one or more data layers or a preamble layer of the one or more preamble layers based at least in part on a cross-correlation metric of the each signature sequence, scrambling the one or more data layers and the one or more preamble layers into a shared signal using the assigned each signature sequence, and transmitting the shared signal.

An apparatus for wireless communications is described. The apparatus may include means for identifying one or more data layers and one or more preamble layers for transmission, means for determining a set of signature sequences for scrambling the one or more data layers and the one or more preamble layers, means for assigning each signature sequence of the set of signature sequences to a data layer of the one or more data layers or a preamble layer of the one or more preamble layers based at least in part on a cross-correlation metric of the each signature sequence, means for scrambling the one or more data layers and the one or more preamble layers into a shared signal using the assigned each signature sequence, and means for transmitting the shared signal.

Another apparatus for wireless communications is described. The apparatus may include a processor, memory in electronic communication with the processor, and instructions stored in the memory. The instructions may be operable to cause the processor to identify one or more data layers and one or more preamble layers for transmission, determine a set of signature sequences for scrambling the one or more data layers and the one or more preamble layers, assign each signature sequence of the set of signature sequences to a data layer of the one or more data layers or a preamble layer of the one or more preamble layers based at least in part on a cross-correlation metric of the each signature sequence, scramble the one or more data layers and the one or more preamble layers into a shared signal using the assigned each signature sequence, and transmit the shared signal.

A non-transitory computer-readable medium for wireless communications is described. The non-transitory computer-readable medium may include instructions operable to cause a processor to identify one or more data layers and one or more preamble layers for transmission, determine a set of signature sequences for scrambling the one or more data layers and the one or more preamble layers, assign each signature sequence of the set of signature sequences to a data layer of the one or more data layers or a preamble layer of the one or more preamble layers based at least in part on a cross-correlation metric of the each signature sequence, scramble the one or more data layers and the one or more preamble layers into a shared signal using the assigned each signature sequence, and transmit the shared signal.

In some examples of the method, apparatus, and non-transitory computer-readable medium described above, assigning the each signature sequence of the set of signature sequences to the data layer of the one or more data layers or the preamble layer of the one or more preamble layers further includes assigning a first set of signature sequences of the set of signature sequences to the one or more data layers, the first set of signature sequences corresponding to cross-correlation values that may be lower than cross-correlation values of a second set of signature sequences of the set of signature sequences, and assigning the second set of signature sequences to the one or more preamble layers.

Some examples of the method, apparatus, and non-transitory computer-readable medium described above may further include processes, features, means, or instructions for receiving a signature sequence allocation message from a base station, where the set of signature sequences may be determined according to the signature sequence allocation message.

Some examples of the method, apparatus, and non-transitory computer-readable medium described above may further include processes, features, means, or instructions for selecting the set of signature sequences from a signature sequence pool, where the set of signature sequences may be determined according to the selecting. In some examples of the method, apparatus, and non-transitory computer-readable medium described above, the selecting the set of signature sequences from the signature sequence pool may be based at least in part on a pseudo-random selection procedure.

Some examples of the method, apparatus, and non-transitory computer-readable medium described above may further include processes, features, means, or instructions for assigning different modulation schemes, channel coding schemes, power allocations, or a combination thereof to the one or more data layers, the one or more preamble layers, or a combination thereof. Some examples of the method, apparatus, and non-transitory computer-readable medium described above may further include processes, features, means, or instructions for dynamically configuring the modulation schemes, channel coding schemes, power allocations, or the combination thereof each layer of the one or more data layers, the one or more preamble layers, or the combination thereof, where assigning the different modulation schemes, the channel coding schemes, the power allocations, or the combination thereof may be based at least in part on the dynamic configuration.

Some examples of the method, apparatus, and non-transitory computer-readable medium described above may further include processes, features, means, or instructions for assigning a same modulation scheme, channel coding scheme, power allocation, or a combination thereof to the one or more data layers, the one or more preamble layers, or a combination thereof.

In some examples of the method, apparatus, and non-transitory computer-readable medium described above, transmitting the shared signal includes transmitting the shared signal using a Discrete Fourier Transform-spread-orthogonal frequency division multiplexing (DFT-s-OFDM) waveform, a cyclic prefix-orthogonal frequency division multiplexing (CP-OFDM) waveform, or a combination thereof.

Some examples of the method, apparatus, and non-transitory computer-readable medium described above may further include processes, features, means, or instructions for transmitting one or more demodulation reference signals (DMRSs) prior to transmitting the shared signal, where the one or more DMRSs include information for detecting the shared signal. In other examples of the method, apparatus, and non-transitory computer-readable medium described above, the shared signal includes a self-decodable signal.

In some examples of the method, apparatus, and non-transitory computer-readable medium described above, a preamble of the one or more preamble layers includes a default value, a pre-determined sequence, a pseudo-random sequence, or a combination thereof.

In some examples of the method, apparatus, and non-transitory computer-readable medium described above, the set of signature sequences includes orthogonal signature sequences, non-orthogonal signature sequences, or a combination thereof. In some examples of the method, apparatus, and non-transitory computer-readable medium described above, the shared signal includes a NOMA signal.

A method of wireless communications is described. The method may include receiving a candidate signal from a UE, determining one or more preamble layers scrambled in the candidate signal, and decoding one or more data layers scrambled in the candidate signal based at least in part on the one or more preamble layers.

An apparatus for wireless communications is described. The apparatus may include means for receiving a candidate signal from a UE, means for determining one or more preamble layers scrambled in the candidate signal, and means for decoding one or more data layers scrambled in the candidate signal based at least in part on the one or more preamble layers.

Another apparatus for wireless communications is described. The apparatus may include a processor, memory in electronic communication with the processor, and instructions stored in the memory. The instructions may be operable to cause the processor to receive a candidate signal from a UE, determine one or more preamble layers scrambled in the candidate signal, and decode one or more data layers scrambled in the candidate signal based at least in part on the one or more preamble layers.

A non-transitory computer-readable medium for wireless communications is described. The non-transitory computer-readable medium may include instructions operable to cause a processor to receive a candidate signal from a UE, determine one or more preamble layers scrambled in the candidate signal, and decode one or more data layers scrambled in the candidate signal based at least in part on the one or more preamble layers.

Some examples of the method, apparatus, and non-transitory computer-readable medium described above may further include processes, features, means, or instructions for jointly decoding the one or more preamble layers with the one or more data layers. In some examples of the method, apparatus, and non-transitory computer-readable medium described above, decoding the one or more data layers includes performing a message-passing procedure, where the one or more preamble layers may be used as prior information for the message-passing procedure.

Some examples of the method, apparatus, and non-transitory computer-readable medium described above may further include processes, features, means, or instructions for performing channel estimation for the candidate signal based at least in part on the one or more preamble layers, where the one or more data layers may be decoded based at least in part on the channel estimation. In some examples of the method, apparatus, and non-transitory computer-readable medium described above, performing the channel estimation for the candidate signal includes comparing the one or more preamble layers to one or more expected preamble values. In some examples of the method, apparatus, and non-transitory computer-readable medium described above, a preamble value of the one or more expected preamble values includes a default value, a pre-determined sequence, a pseudo-random sequence, or a combination thereof.

Some examples of the method, apparatus, and non-transitory computer-readable medium described above may further include processes, features, means, or instructions for transmitting a signature sequence allocation message to the UE, where the candidate signal received from the UE may be based at least in part on the signature sequence allocation message. Some examples of the method, apparatus, and non-transitory computer-readable medium described above may further include processes, features, means, or instructions for determining a set of signature sequences, where the signature sequence allocation message indicates the set of signature sequences and where determining the one or more preamble layers scrambled in the candidate signal may be based at least in part on the set of signature sequences.

Some examples of the method, apparatus, and non-transitory computer-readable medium described above may further include processes, features, means, or instructions for determining a set of signature sequences for detecting the one or more data layers. Some examples of the method, apparatus, and non-transitory computer-readable medium described above may further include processes, features, means, or instructions for descrambling the one or more data layers from the candidate signal based at least in part on the set of signature sequences, where decoding the one or more data layers scrambled in the candidate signal may be based at least in part on the descrambling.

Some examples of the method, apparatus, and non-transitory computer-readable medium described above may further include processes, features, means, or instructions for receiving one or more DMRSs for the candidate signal. Some examples of the method, apparatus, and non-transitory computer-readable medium described above may further include processes, features, means, or instructions for performing channel estimation for the candidate signal based at least in part on the one or more DMRSs, where the one or more data layers may be decoded based at least in part on the channel estimation.

Some examples of the method, apparatus, and non-transitory computer-readable medium described above may further include processes, features, means, or instructions for determining a set of signature sequences for detecting the one or more preamble layers. Some examples of the method, apparatus, and non-transitory computer-readable medium described above may further include processes, features, means, or instructions for descrambling the one or more preamble layers from the candidate signal based at least in part on the set of signature sequences, where determining the one or more preamble layers scrambled in the candidate signal may be based at least in part on the descrambling.

In some examples of the method, apparatus, and non-transitory computer-readable medium described above, the candidate signal includes a self-decodable signal.

In some examples of the method, apparatus, and non-transitory computer-readable medium described above, the candidate signal includes a NOMA signal. In some examples of the method, apparatus, and non-transitory computer-readable medium described above, the candidate signal includes a shared signal.

DETAILED DESCRIPTION

Figure 1:
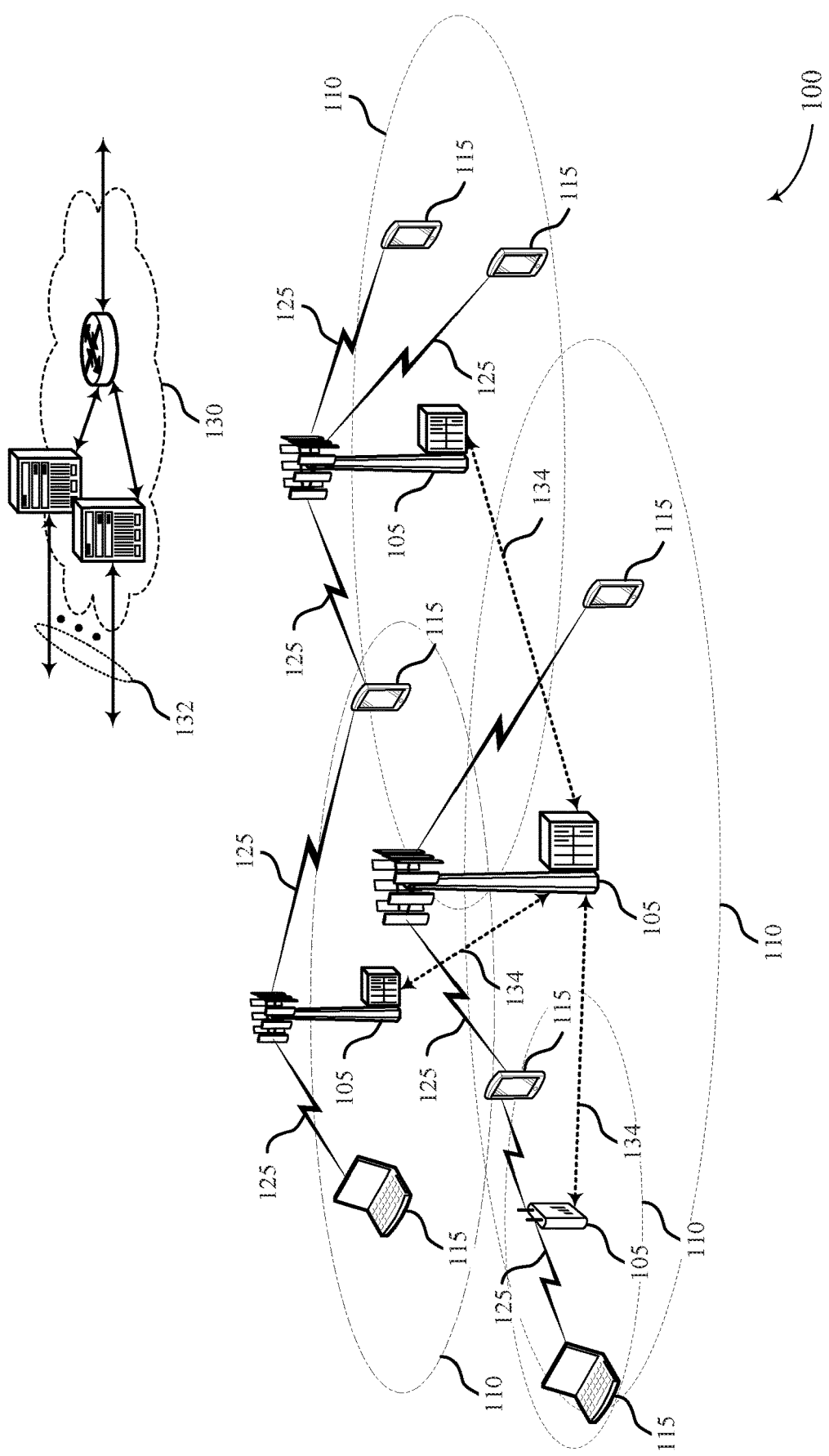
FIGS. 1 and 2 illustrate examples of wireless communications systems that support parallel transmission of preamble sequences with data layers for improved data detection in accordance with aspects of the present disclosure.

In some wireless communications systems (e.g., non-orthogonal multiple access (NOMA) or massive Internet of Things (IoT) systems), a base station may provide uplink access to a large number of user equipments (UEs) within a given time frame (e.g., a transmission time interval (TTI), a slot). But the number of reference signals available for use by UEs in this time frame may be limited due to certain parameters or constraints. Accordingly, to efficiently utilize the uplink access capabilities of the system, many UEs may transmit on the uplink without using reference signals (e.g., demodulation reference signals (DMRSs)). In some cases, transmitting self-decodable signals (e.g., signals without corresponding reference signals) may result in reduced detectability performance at the base station. To mitigate this reduction in detectability and better support self-decodable signals, a UE may implement parallel transmission of preamble sequences with uplink data. In some cases, UEs may use these parallel transmissions along with reference signals for redundancy in detection performance.

To implement the parallel transmissions, a UE may identify uplink data for transmission. The UE may split the uplink data into one or more data layers (e.g., based on a target spectral efficiency), and may determine one or more preambles (as one example) to transmit along with the data. The preambles may be examples of default values, predetermined sequences, pseudo-random sequences, or some combination of these. A base station receiving the signal may include an indication of the preambles available to the UEs, such that the base station may identify preambles received on the uplink.

In some examples, the data layers and the preamble layers may be superposed. To superpose the data layers and the preamble layers, the UE may determine a set of signature sequences. The UE may assign a different signature sequence to at least some of, if not each of, the code layers (e.g., where every data layer and every preamble layers is assigned a different sequence), which may in some cases be based on cross-correlation values of the sequences. For example, the UE may split the set of signatures sequences into a first group of sequences corresponding to a first set of cross-correlation values (e.g., relatively lower cross-correlation values) and a second group of sequences corresponding to a second set of cross-correlation values (e.g., relatively higher cross-correlation values), and may assign the first group of sequences to the data layers and the second group of sequences to the preamble layers. In this way, the UE may improve the detectability of the data layers due to the low cross-correlation values of their assigned signature sequences.

The UE may scramble the data layers and preamble layers using the assigned signature sequences, and may superpose the scrambled layers into a shared signal. The UE may transmit this shared signal on the uplink to a base station. The base station may detect and decode the uplink data (e.g., based on the preamble layers). For example, in some cases, the base station may determine at least one preamble layer, and may perform channel estimation based on the received preamble related to the at least one preamble layer. In other cases, the base station may jointly decode the data and preamble layers, and may use the preambles as prior information for a message-passing procedure to decode the uplink data. The parallel transmission of the preambles with the data may improve the data detection performance at the base station, allowing UEs to reliably transmit self-decodable uplink signals and efficiently utilize the uplink access capabilities of a NOMA wireless system.

Aspects of the disclosure are initially described in the context of wireless communications systems. Additional aspects of the disclosure are described with respect to signal generation process and process flows. Aspects of the disclosure are further illustrated by and described with reference to apparatus diagrams, system diagrams, and flowcharts that relate to parallel transmission of preamble sequences with data layers for improved data detection.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the received signal with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of Ts=1/30,720,000 seconds. Time intervals of a communications resource may be organized according to radio frames each having a duration of 10 milliseconds (ms), where the frame period may be expressed as Tf=307,200 Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some wireless communications systems 100 (e.g., NOMA or massive IoT systems), a base station 105 may provide uplink access to a large number of UEs 115 within a given time frame (e.g., a TTI, a slot). The number of reference signals available for use by UEs 115 in this time frame, however, may be limited. Accordingly, to efficiently utilize the uplink access capabilities of the system, many UEs 115 may transmit on the uplink without using reference signals (e.g., DMRSs). Transmitting self-decodable signals (e.g., signals without corresponding reference signals) may result in a reduction in detectability performance at the base station 105. To improve this detectability performance and better support these self-decodable signals, a UE 115 may implement parallel transmission (e.g., concurrent transmission) of preamble sequences with uplink data. In some cases, the UE 115 may use these parallel transmissions along with reference signals for additional redundancy.

To implement the parallel transmissions, a UE 115 may identify uplink data for transmission. The UE 115 may allocate the uplink data amongst one or more data layers (e.g., based on a desired spectral efficiency), and may determine one or more preambles to transmit along with the data. The preambles may be examples of default values, pre-determined sequences, pseudo-random sequences, or some combination of these, among other possibilities. The base station 105 may include an indication of the preambles available to the UEs 115, such that the base station 105 may identify any preambles received in an uplink signal. To superpose the data layers and the preamble layers, the UE 115 may determine a set of signature sequences. The UE 115 may assign a different signature sequence to each code layer (e.g., where every data layer and every preamble layers is assigned a different sequence) or using a different mapping to one or more code layers based on cross-correlation values of the sequences. For example, the UE 115 may split the set of signatures sequences into a first group of sequences corresponding to relatively lower cross-correlation values and a second group of sequences corresponding to relatively higher cross-correlation values, and may assign the first group of sequences to the data layers and the second group of sequences to the preamble layers. In this way, the UE 115 may improve the detectability of the data layers due to the low cross-correlation values of the assigned signature sequences.

The UE 115 may scramble the data layers and preamble layers using the assigned signature sequences, and may superpose the scrambled layers into a shared signal. The UE 115 may transmit the shared signal on the uplink to a base station 105. The base station 105 may detect and decode the uplink data based on the preamble layers. For example, in some cases, the base station 105 may determine at least one preamble layer, and may perform channel estimation based on the received preamble. In other cases, the base station 105 may jointly decode the data and preamble layers, and may use the preambles as prior information for a message-passing procedure to decode the uplink data. The parallel transmission of the preambles with the data may improve the data detection performance at the base station 105, allowing UEs 115 to reliably transmit self-decodable uplink signals.

Figure 2:
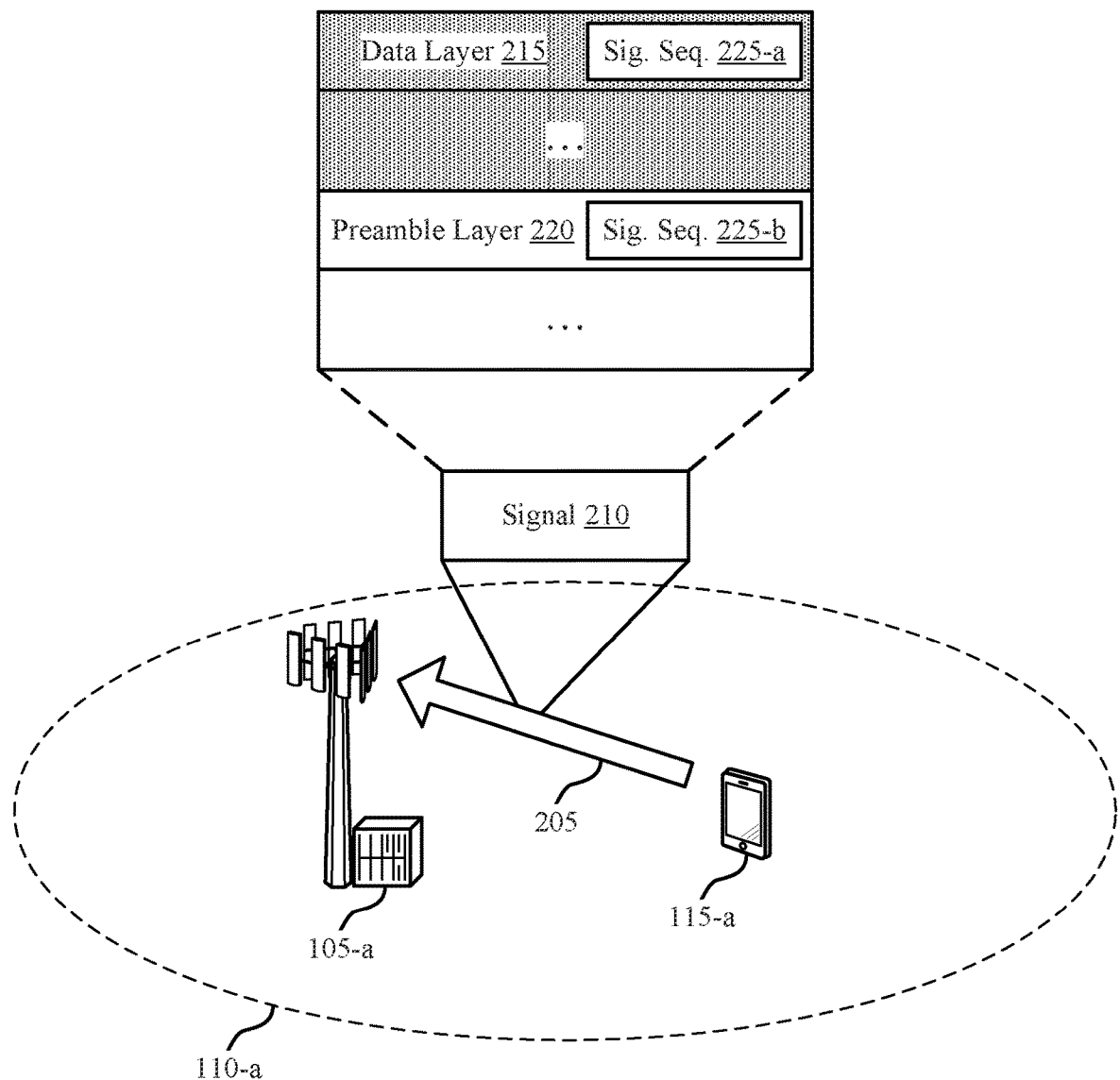

FIG. 2 illustrates an example of a wireless communications system 200 that supports parallel transmission of preamble sequences with data layers for improved data detection in accordance with various aspects of the present disclosure. The wireless communications system 200 may include base station 105-*a* and UE 115-*a*, which may be examples of a base station 105 and a UE 115 respectively, as described with reference to FIG. 1. Base station 105-*a* may serve UEs 115 within a geographic area 110-*a*, including UE 115-*a*, which may transmit on the uplink 205 to base station 105-*a* within a NOMA wireless system. In some cases, UE 115-*a* may implement parallel transmissions of one or more data layers 215 and one or more preamble layers 220 within a signal 210 for improved data detection at base station 105-*a*.

In some wireless systems (e.g., NOMA systems), base station 105-*a* may provide uplink access to a large number of UEs 115 at the same time (e.g., simultaneously, during a same TTI,) within a certain geographic area 110. For example, the wireless communications system 200 may be an example of a massive IoT system, as one case, and may correspondingly support one millions UEs 115 per square kilometer (km) on the uplink 205 in some implementations. A large number of or each of these UEs 115 may, in some cases, transmit data on the uplink 205 in one or more data streams. A subset of the UEs 115 may transmit one or more reference signals (e.g., DMRSs) with the uplink data for channel estimation, and base station 105-*a* may reliably detect and receive these data transmissions based on the reference signals. In a NOMA system, however, base station 105-*a* may support uplink access for a larger number of UEs 115 than the number of available reference signals. Accordingly, a number of UEs 115 may transmit self-decodable data transmissions on the uplink 205 (e.g., data transmitted independent of any corresponding reference signals). To improve detection of such data, UEs 115 may implement parallel transmission of at least some additional information, which may include one or more preambles, with the data transmission. This additional information (e.g., preamble) may be used by base station 105-*a* for channel estimation (e.g., similar to a reference signal), or for joint decoding, or both. In some cases, UEs 115 may implement parallel preamble transmissions in addition to reference signal transmissions to add redundancy to the channel estimation procedure, improving the detection performance without negatively affecting the spectrum efficiency.

To implement the parallel transmission, UE 115-*a* may identify data to transmit on the uplink 205. UE 115-*a* may separate the data into one or more data layers 215 for transmission. Each data layer 215 may be an example of a code layer or sub-code layer corresponding to a different signature sequence 225. UE 115-*a* may additionally determine a number of preambles to transmit, where each preamble may be transmitted in a different preamble layer 220. Each preamble may, in some cases, be an example of a value or sequence known by the base station 105-*a*. For example, the preamble may be an example of a pre-determined value or sequence, a frozen bit sequence (e.g., with all bits set to a frozen bit value, such as "0"), a known training sequence, a pseudo-random value or sequence, or some combination of these or similar values or sequences. Base station 105-*a* may store in memory one or more potential preambles for detection. In this way, if base station 105-*a* identifies a known preamble in a signal candidate, the base station 105-*a* may determine that the signal candidate corresponds to an uplink signal 210 including one or more data layers 215, and may improve detection of the data layers 215 based on decoding one or more preamble layers 220.

To transmit the data layers 215 and preamble layers 220 together in a shared signal 210 (e.g., without reducing the spectral efficiency), UE 115-*a* may assign different signature sequences 225 to various code layers (e.g., each code layer).

For example, UE 115-*a* may assign signature sequence 225-*a* to data layer 215, and may assign signature sequence 225-*b* to preamble layer 220. UE 115-*a* may then scramble the layers using the assigned signature sequences, and may superpose the scrambled layers into a single signal 210. By utilizing at least some different signature sequences 225 for the different layers, base station 105-*a* at the receiver-side may separate the code layers according to the signature sequences 225 to determine the preambles and the uplink data, and use the information appropriately.

In some cases, UE 115-*a* may assign the signature sequences 225 to the different layers based on cross-correlation metrics for the signature sequences 225. For example, UE 115-*a* may determine a number code layers for transmission (e.g., including one or more data layers 215 and one or more preamble layers 220), and may identify a number of signature sequences 225 equal to the number of code layers. UE 115-*a* may identify cross-correlation values for each of these signature sequences 225. In some cases, the cross-correlation values may be calculated using a cross-correlation function. In other cases, these cross-correlation values may be binary values indicating a relative cross correlation (e.g., a relatively high cross-correlation, a relatively low cross-correlation) compared to the other selected signature sequences 225. UE 115-*a* may assign the signature sequences 225 corresponding to the lower cross-correlation values to the data layers 215, and may assign the signature sequences 225 corresponding to the higher cross-correlation values to the preamble layers 220. In some cases, UE 115-*a* may identify one or more data layers 215 containing certain data (e.g., high priority data), and may assign the signature sequences 225 with the lowest cross-correlation values to these identified high priority data layers 215. As illustrated, signature sequence 225-*a* may have a lower cross-correlation value or metric than signature sequence 225-*b*. By assigning signature sequences 225 based on cross-correlation metrics, UE 115-*a* may improve the detection reliability of the data.

Base station 105-*a* receiving the signal 210 may detect the data layers 215 based on the preamble layers 220. For example, in a NOMA system, base station 105-*a* may not schedule UE 115-*a* for uplink transmission. Instead, base station 105-*a* may monitor the channel for signals 210, and may decode the associated data upon detecting a signal 210. For example, base station 105-*a* may detect a candidate signal. In some cases, base station 105-*a* may decode one or more preamble layers 220, and may identify that the candidate signal corresponds to an uplink signal 210 based on the preamble layers 220. Base station 105-*a* may include an indication (e.g., a table in memory, a preamble generation function) of potential preambles, and may monitor for these preambles scrambled in an uplink signal 210. Additionally or alternatively, base station 105-*a* may contain an indication of potential sequences used by UE 115-*a*, and may attempt to descramble (e.g., unscramble), the code layers using these signature sequences 225. When base station 105-*a* detects a signal 210, base station 105-*a* may in some cases perform channel estimation using the received preamble layers 220, and may decode the data layers 215 based on the channel estimation.

In other cases, base station 105-*a* may utilize an advanced receiver (e.g., a message-passing receiver) for receiving and jointly decoding the different coding layers. For example, base station 105-*a* may jointly decode one or more preamble layers 220 and one or more data layers 215 using the receiver. In some cases, the receiver may use one or more decoded preamble layers 220 as prior information for a message-passing procedure to decode the data layers 215. For self-decodable signals 210, base station 105-a may decode the data layers 215 using the preamble layers 220 in place of reference signals. For signals 210 transmitted with corresponding reference signals (e.g., DMRSs), base station 105-a may decode the data layers 215 using the preamble layers 220 in addition to the reference signals.

Figure 3:
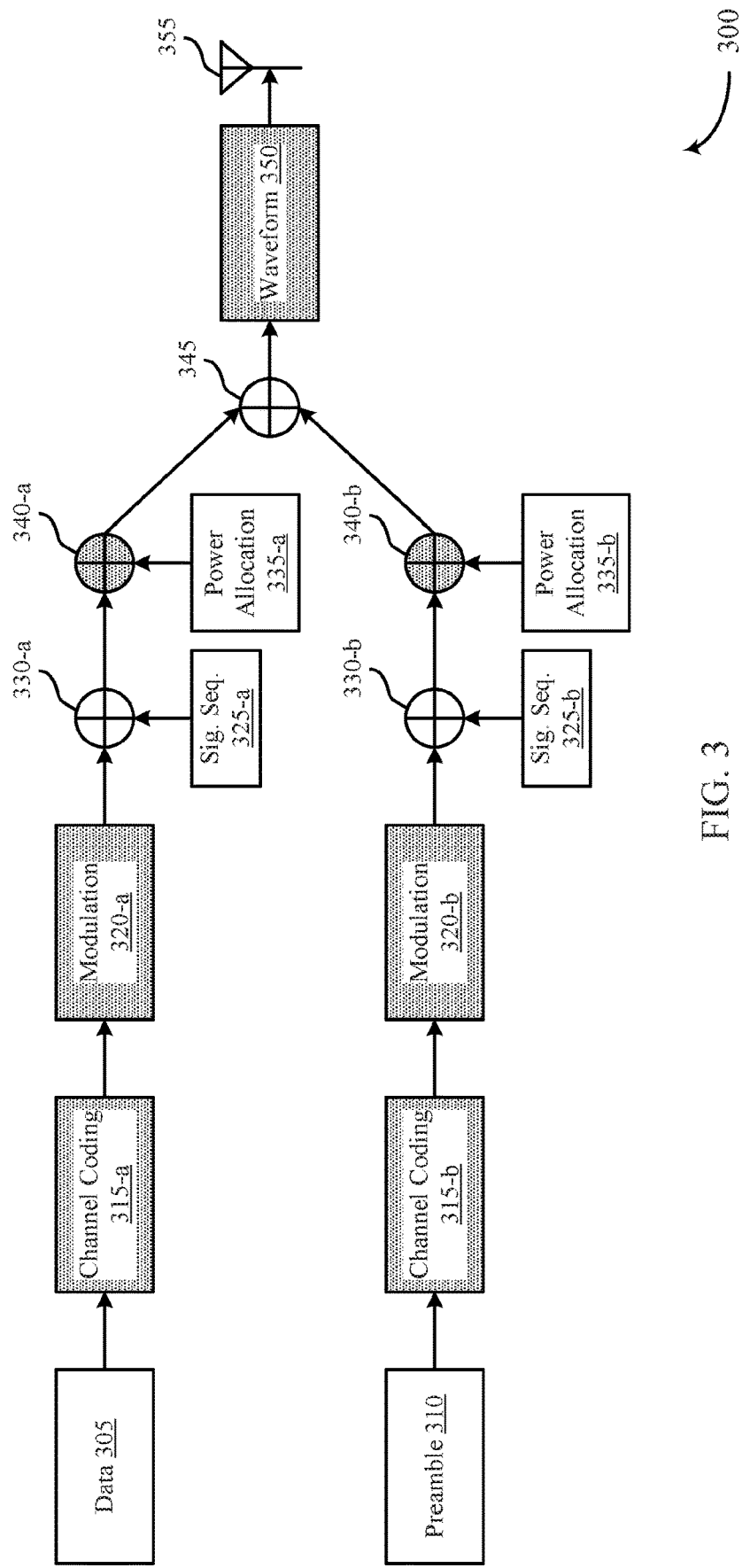
FIGS. 3 and 4 illustrate examples of signal generation processes that support parallel transmission of preamble sequences with data layers for improved data detection in accordance with aspects of the present disclosure.

FIG. 3 illustrates an example of a signal generation process 300 including a single data stream and a single preamble that supports parallel transmission of preamble sequences with data layers for improved data detection in accordance with various aspects of the present disclosure. The signal generation process 300 may be performed by a UE 115 as described with reference to FIGS. 1 and 2. The signal generation process 300 may involve at least one data layer 305 and preamble layer 310. These layers may be scrambled (e.g., based on scrambling processes 330) according to different signature sequences 325, and may be superposed onto a shared signal according to a superposition process 345. The UE 115 may transmit this superposed signal using an antenna 355. In some cases, the signal generation process 300 may include additional processes, such as channel coding 315, modulation 320, power allocation 340, waveform generation 350, or some combination of these or other signal generation procedures.

A UE 115 may identify the data layer 305 and preamble 310 for transmission. For example, the UE 115 may identify data queued in a data buffer for uplink transmission, and may assign the data to a single data layer 305. The UE 115 may determine the preamble 310 using a pseudo-random selection process. In some cases, the UE 115 may select the preamble 310 from a list of possible preambles 310, or may determine the preamble 310 using a preamble generation function (e.g., based on a dynamic or configured input value for the preamble generation function).

In some systems, the UE 115 may perform processes or modifications on these code layers. For example, the UE 115 may perform channel coding 315, modulation 320, or both on one or more of the code layers. Channel coding 315 may involve the UE 115 adding bits or sequences of bits to the code layer to increase redundancy or reduce the error rate. These added bits may involve parity check bits, cyclic redundancy check (CRC) bits, convolutional codes, or some combination of these or other bits associated with channel coding 315 techniques. Modulation 320 may involve encoding the bits (e.g., the data or preamble bits combined with any error correction bits) onto a carrier signal using one or more modulation techniques. In some cases, the channel coding 315 and modulation 320 techniques implemented for each code layer may be the same. In other cases, the UE 115 may utilize different techniques for different code layers. For example, the UE 115 may implement channel coding 315-a and modulation 320-a to modify the data layer 305, while implementing different channel coding 315-b, modulation 320-b, or both to modify the preamble layer 310. In some cases, the UE 115 may utilize different channel coding 315, modulation 320, or a combination of these for each code layer. In other cases, the UE 115 may utilize a first channel coding 315-a, modulation 320-a, or both for all data layers 305, and a second channel coding 315-b, modulation 320-b, or both for all preamble layers 310.

The UE 115 may then scramble the signals using signature sequences 325. In some cases, a base station 105 may allocate the signature sequences 325 for a UE 115 to use. For example, in a grant-based procedure, the base station 105 may transmit a signature sequence grant to the UE 115, and the UE 115 may determine the signature sequences 325 to use for scrambling based on the grant. In other cases (e.g., in a grant-free procedure), the UE 115 may determine the signature sequences 325 without input from the base station 105. For example, the UE 115 may select the signature sequences 325 from one or more sequence pools (e.g., using a pseudo-random selection procedure). The selected signature sequences 325 may or may not be orthogonal. For example, even in a NOMA system, certain combinations of signature sequences 325 may be orthogonal, although most of the signature sequences 325 may not be orthogonal. The UE 115 may assign the signature sequences 325 to the different code layers for scrambling. Each code layer may utilize a different signature sequence 325 for scrambling or spreading. The different signature sequences 325 may define the different code layers. For example, applying the different signature sequences 325 to different bits or signals may split the information into the multiple code layers.

The UE 115 may implement a same scrambling process 330 for each of the code layers, or may implement different scrambling processes 330 (e.g., scrambling process 330-a for data layer 305 and scrambling process 330-b for preamble layer 310) for different code layers. In either case, the UE 115 may utilize different signature sequences 325 for the scrambling processes 330. For example, the UE 115 may assign signature sequence 325-a to the data layer 305 and may assign signature sequence 325-b to the preamble layer 310, and may scramble each layer using the assigned signature sequence 325.

In some cases, the UE 115 may perform power allocation 340 for the scrambled signals. These power allocation 340 processes may utilize the same or different power allocation 340 operations or functions (e.g., power allocation 340-a for the data layer 305 and power allocation 340-b for the preamble layer 310). Additionally, the UE 115 may apply the same or different power allocation values 335 to these power allocation 340 processes. In some cases, the UE 115 may dynamically configure these power allocation values 335 for each layer (e.g., configuring power allocation value 335-a for the data layer 305 and power allocation value 335-b for the preamble layer 310). In some examples, a base station 105 may use different power allocation values 335 (e.g., for different code layers at a UE 115 or for different UEs 115) to differentiate between layers or UEs 115.

The UE 115 may superpose the resulting signals into a shared signal (e.g., based on a superposition process 345). In some cases, the UE 115 may fit the shared signal to a waveform 350 (e.g., a Discrete Fourier Transform-spread-orthogonal frequency division multiplexing (DFT-s-OFDM) waveform, a cyclic prefix-orthogonal frequency division multiplexing (CP-OFDM) waveform, or some combination of these or other waveforms). The UE 115 may send the resulting signal or waveform to an antenna 355 for transmission to a base station 105. The base station 105 may receive the transmitted signal with an improved detection performance based on the superposed preamble layer 310.

Figure 4:
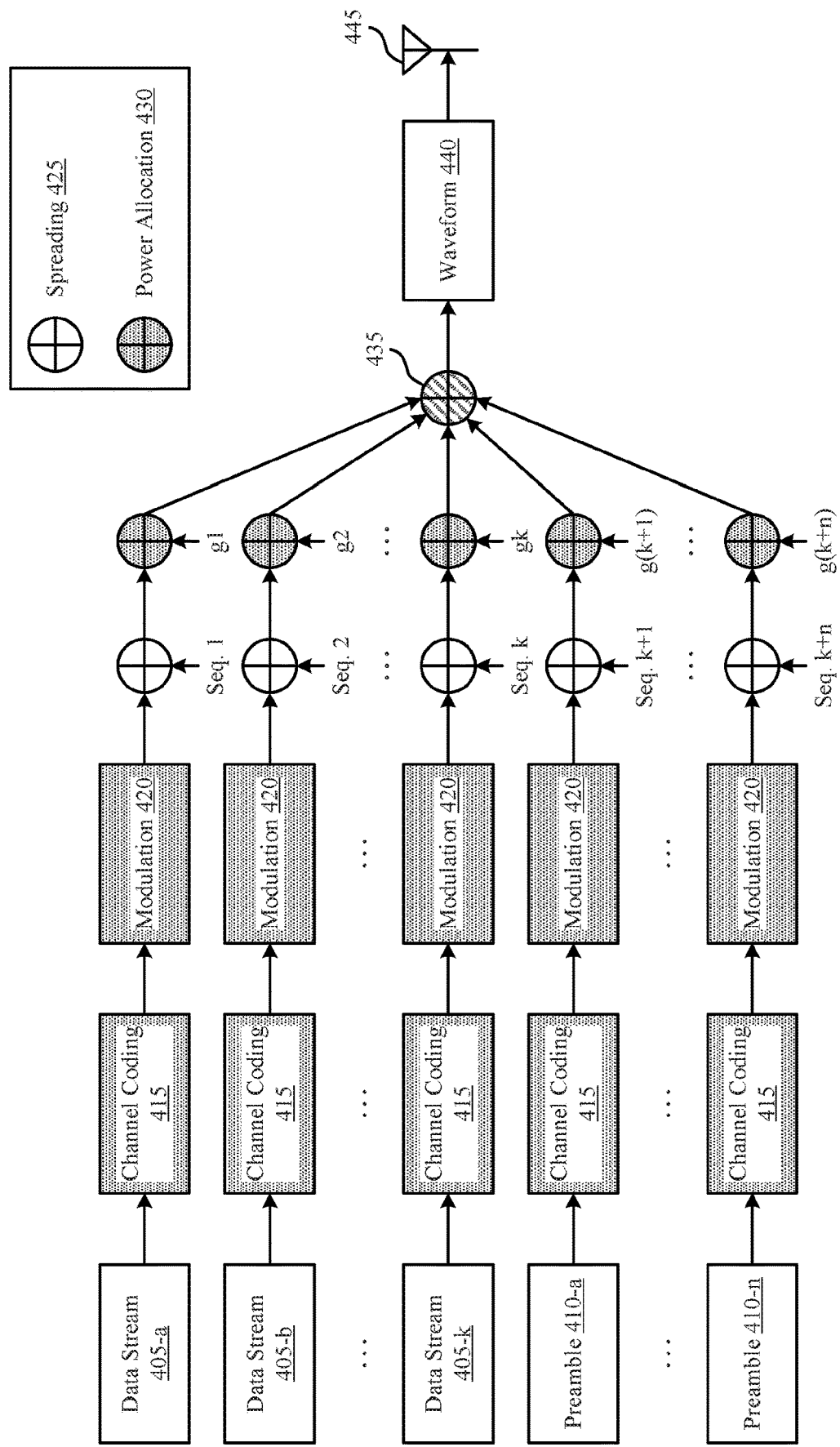

FIG. 4 illustrates an example of a signal generation process 400 including multiple data streams and preambles that supports parallel transmission of preamble sequences with data layers for improved data detection in accordance with various aspects of the present disclosure. The signal generation process 400 may be performed by a UE 115 as described with reference to FIGS. 1 through 3. The signal generation process 400 may be an extension of the signal generation process 300, involving multiple data streams 405 and preambles 410 (e.g., k data streams 405 and n preambles 410).

These layers may all be scrambled according to different signature sequences and superposed into a single shared signal for transmission. Involving a greater number of code layers may polarize the cross-correlation values for the signature sequences. For example, in the signal generation process 300 including a single data stream and a single preamble, the signature sequences may have the same cross-correlation values, as only two sequences are used. However, in signal generation process 400 including n+k code layers and, correspondingly, n+k signature sequences, different sequences may have different cross-correlation values within the sequence set.

The UE 115 may identify k data streams 405 for transmission within a shared signal. In some cases, the UE 115 may determine the number of data layers to implement based on an amount of uplink data, a target spectral efficiency for the uplink data, or a combination thereof. Similarly, the UE 115 may identify n preambles 410 for transmission parallel to the k data streams 405, resulting in a total number of code layers k+n. The signal generation process 400 may include similar processes to those described above, for example, with respect to FIG. 3. For example, the UE 115 may perform channel coding 415, modulation 420, scrambling or spreading 425, power allocation 430, superposition 435, waveform generation 440, or any combination of these signal generation procedures before transmitting the shared signal using an antenna 445.

These processes may be performed differently for different code layers, or may be applied universally (e.g., uniformly). For example, in one specific case, the UE 115 may utilize a same channel coding 415 and modulation 420 procedure for all of the code layers, but may utilize different power allocation values, g, for the power allocation 430. For example, the UE 115 may determine power allocation values g1, g2, . . . g(k+n) corresponding to each code layer, where the power is split unevenly between the data streams 405 and the preambles 410. For example, the UE 115 may utilize ⅔ of the available power for the preambles 410, and the remaining ⅓ of the power for the data streams 405. Alternatively, the UE 115 may split the power evenly between each code layer, or may split the power evenly between data power and preamble power. In some cases, the UE 115 may further split the allocated power for different data streams 405 or different preambles 410 unevenly. In other cases, each data stream 405 may use a power allocation value equal to 1/k the allocated data power, and each preamble 410 may use a power allocation value equal to 1/n the allocated preamble power. The UE 115 may determine the power allocation statically or dynamically (e.g., on a layer-by-layer basis). In some examples, a base station 105 may transmit an indication of power allocation procedures for the UE 115. In other examples, the UE 115 may determine power allocation values based on received signal-to-noise ratio (SNR) measurements.

Additionally or alternatively, the UE 115 may assign different signatures sequences to the different code layers based on cross-correlation metrics of the signature sequences. For example, the UE 115 may determine a set of k+n signature sequences (e.g., based on a grant-based or grant-free procedure) to perform the parallelization of the code layers. The UE 115 may determine cross-correlation metrics for each signature sequence of this set of signature sequences (e.g., based on a lookup table in memory, a cross-correlation equation, groupings of the signature sequences). In some cases, these cross-correlation metrics may be examples of absolute metrics (e.g., values between 0 and 1). The UE 115 may order the signature sequences by cross-correlation metric, and may assign the signature sequences with lower cross-correlation metrics to the data streams 405.

In some cases, the UE 115 may assign the lowest cross-correlation metric to data stream 405-a, the second lowest to data stream 405-b, etc. In other cases, the UE 115 may determine the k lowest cross-correlation metrics, and may assign the corresponding k signature sequences pseudo-randomly to the k data streams. The UE 115 may perform similar procedures to assign the n signature sequences with the n highest cross-correlation metrics to the n preambles 410. As lower cross-correlation values may correspond to better detection performance, the UE 115 may distribute the signature sequences in this way to improve data detection reliability at a receiving base station 105. Because the preambles 410 are used to improve data detection, but do not carry any uplink data themselves, applying the signature sequences with worse detection performance to these preambles 410 may not negatively affect uplink data throughput.

Figure 5:
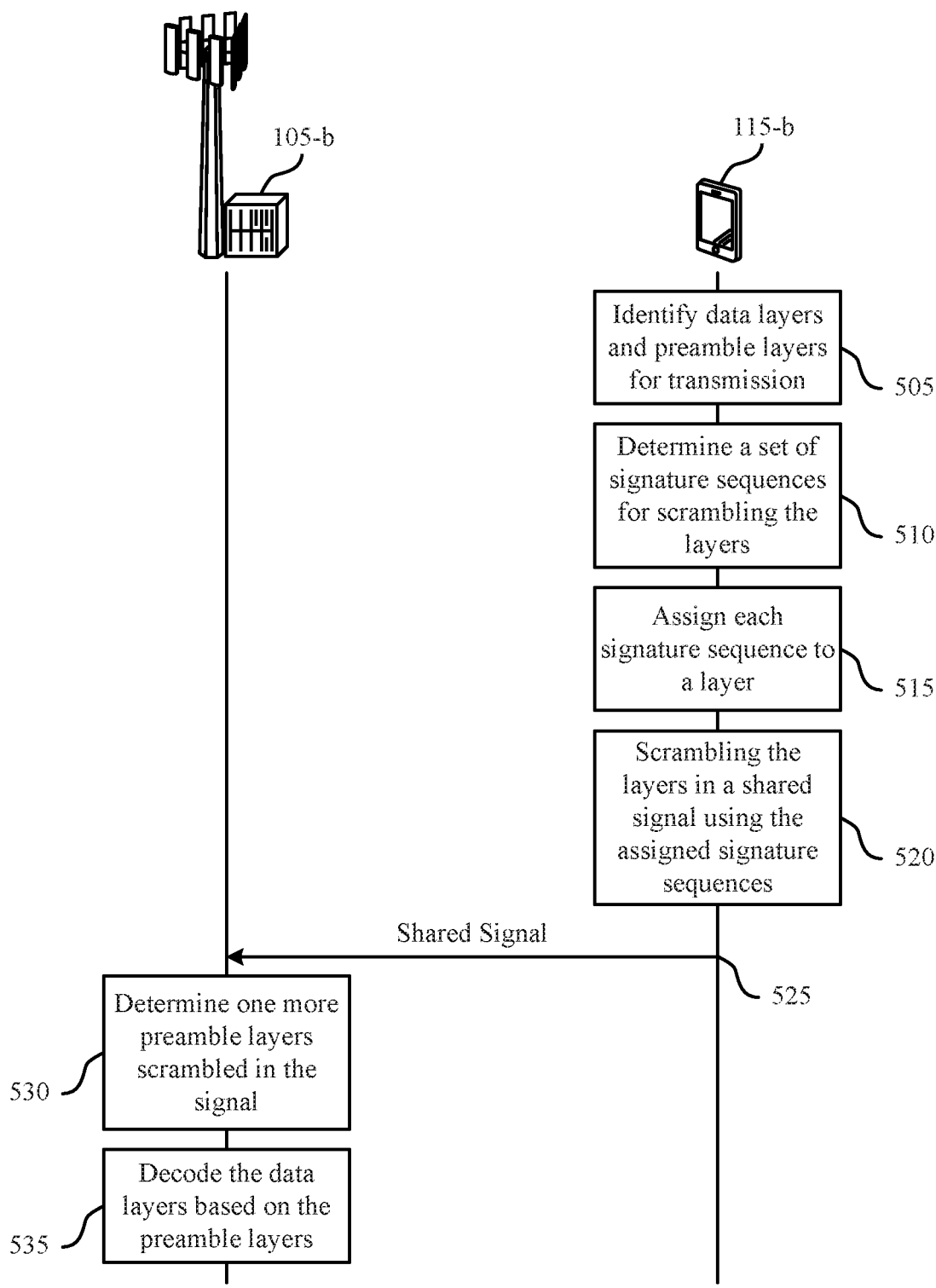
FIG. 5 illustrates an example of a process flow that supports parallel transmission of preamble sequences with data layers for improved data detection in accordance with aspects of the present disclosure.

FIG. 5 illustrates a process flow 500 that supports parallel transmission of preamble sequences with data layers for improved data detection in accordance with various aspects of the present disclosure. Process flow 500 may include UE 115-b and base station 105-b, which may be examples of the corresponding devices as described with reference to FIGS. 1 through 4. UE 115-b may transmit a signal to base station 105-b that includes superposed data and preamble layers for improved detection of the uplink data. In some implementations, the processes described below may be performed in a different order, or may include one or more additional or alternative processes performed by UE 115-b, base station 105-b, or both.

At 505, UE 115-b may identify one or more data layers and one or more preamble layers for transmission. The preamble layers may function as reference signals for the data layers for improved detectability at a base station 105 (e.g., base station 105-b). The preambles at each preamble layer—or, in some cases, spread across multiple preamble layers—may be examples of default values, pre-determined sequences, pseudo-random sequences, or some combination of these. Both UE 115-b and base station 105-b may include indications of the preambles to be used for parallel transmissions.

At 510, UE 115-b may determine a set of signature sequences for scrambling the layers. In some cases (e.g., when operating in a grant-based system), UE 115-b may receive a signature sequence allocation message from base station 105-b indicating the signature sequences to use. In other cases (e.g., when operating in a grant-free system), UE 115-b may select the signatures sequences without any explicit or designated signaling, for example, using one or more sequence pools, one or more lookup tables, one or more sequence generation functions, etc. The set of signature sequences may include a number of sequences equal to the number of layers for transmission (e.g., including both the data layers and preamble layers). These signature sequences may be examples of NOMA signature sequences and, as such, may include orthogonal signature sequences, non-orthogonal signature sequences, or a combination of both.

At 515, UE 115-b may assign a different signature sequence to each code layer. For example, based on the assignments, every signature sequence of the set of signature sequences may correspond to one data layer of the one or more data layers or one preamble layer of the one or more preamble layers. In some cases, the assigning of signature sequences may be based on cross-correlation metrics of each signature sequence. For example, UE 115-*b* may assign a first set of signature sequences with relatively lower cross-correlation values to the data layers, and may assign a second set of signature sequences with relatively higher cross-correlation values to the preamble layers.

At 520, UE 115-*b* may scramble the one or more data layers and the one or more preamble layers into a shared signal using the assigned signature sequences. In some cases, UE 115-*b* may perform additional signal modification procedures to the layers before or after the scrambling. For example, UE 115-*b* may perform modulation, channel coding, power allocation, or some combination of these processes on the data layers, preamble layers, or both. UE 115-*b* may either assign the same modulation schemes, channel coding schemes, and power allocation values to the different layers or layer groups, or may assign different modulation schemes, channel coding schemes, or power allocation values to these layers.

At 525, UE 115-*b* may transmit the shared signal to base station 105-*b*. In some cases, UE 115-*b* may transmit this shared signal with corresponding reference signals (e.g., DMRSs) to aid in decoding. In other cases, UE 115-*b* may transmit this shared signal without corresponding reference signals (e.g., as a self-decodable signal). The shared signal may be an example of a NOMA signal, and may be transmitted using a DFT-s-OFDM waveform, a CP-OFDM waveform, or some combination of these or other waveforms.

Base station 105-*b* may monitor the channel for candidate signals to test for uplink data. When base station 105-*b* receives the shared signal, base station 105-*b* may determine at least one of the one or more preamble layers scrambled in the candidate signal (e.g., at 530). For example, base station 105-*b* may determine a set of signature sequences for detecting the one or more preamble layers, and may descramble the preamble layers from the candidate signal based on these signature sequences. In some cases, base station 105-*b* may include an indication of expected preamble values stored in memory. Base station 105-*b* may compare the expected preamble values to the one or more preamble layers in order to determine one or more received preamble layers.

At 535, base station 105-*b* may decode the one or more data layers based on the determined preamble layers. In some cases, base station 105-*b* may perform channel estimation for the candidate signal using the preamble layers (and any received reference signals corresponding to the candidate signal), and may decode the data layers based on this channel estimation. In other cases, base station 105-*b* may jointly decode the preamble layers and data layers, using the preamble layers as prior information for a message-passing procedure. In some examples, base station 105-*b* may determine a set of signature sequences corresponding to the data layers, and may descrambled the data layers based on these sequences.

Figure 6:
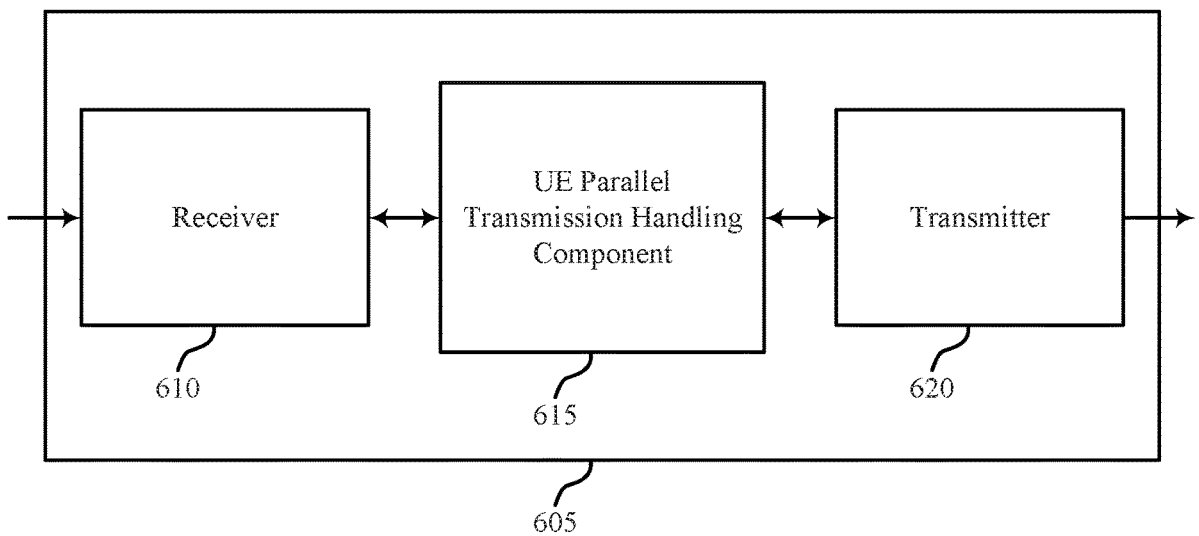
FIGS. 6 through 8 show block diagrams of a device that supports parallel transmission of preamble sequences with data layers for improved data detection in accordance with aspects of the present disclosure.

FIG. 6 shows a block diagram 600 of a wireless device 605 that supports parallel transmission of preamble sequences with data layers for improved data detection in accordance with aspects of the present disclosure. Wireless device 605 may be an example of aspects of a UE 115 as described herein. Wireless device 605 may include receiver 610, UE parallel transmission handling component 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to parallel transmission of preamble sequences with data layers for improved data detection). Information may be passed on to other components of the device. The receiver 610 may be an example of aspects of the transceiver 935 described with reference to FIG. 9. The receiver 610 may utilize a single antenna or a set of antennas.

UE parallel transmission handling component 615 may be an example of aspects of the UE parallel transmission handling component 715, 815, or 915 described with reference to FIGS. 7 through 9.

UE parallel transmission handling component 615 and/or at least some of its various sub-components may be implemented in hardware, software executed by a processor, firmware, or any combination thereof. If implemented in software executed by a processor, the functions of the UE parallel transmission handling component 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE parallel transmission handling component 615 and/or at least some of its various sub-components may be physically located at various positions, including being distributed such that portions of functions are implemented at different physical locations by one or more physical devices.

In some examples, UE parallel transmission handling component 615 and/or at least some of its various sub-components may be a separate and distinct component in accordance with various aspects of the present disclosure. In other examples, UE parallel transmission handling component 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE parallel transmission handling component 615 may identify one or more data layers and one or more preamble layers for transmission, determine a set of signature sequences for scrambling the one or more data layers and the one or more preamble layers, assign each signature sequence of the set of signature sequences to a data layer of the one or more data layers or a preamble layer of the one or more preamble layers based on a cross-correlation metric of each signature sequence, scramble the one or more data layers and the one or more preamble layers into a shared signal using each assigned signature sequence, and transmit the shared signal.

Transmitter 620 may transmit signals generated by other components of the device. In some examples, the transmitter 620 may be collocated with a receiver 610 in a transceiver component. For example, the transmitter 620 may be an example of aspects of the transceiver 935 described with reference to FIG. 9. The transmitter 620 may utilize a single antenna or a set of antennas.

Figure 7:
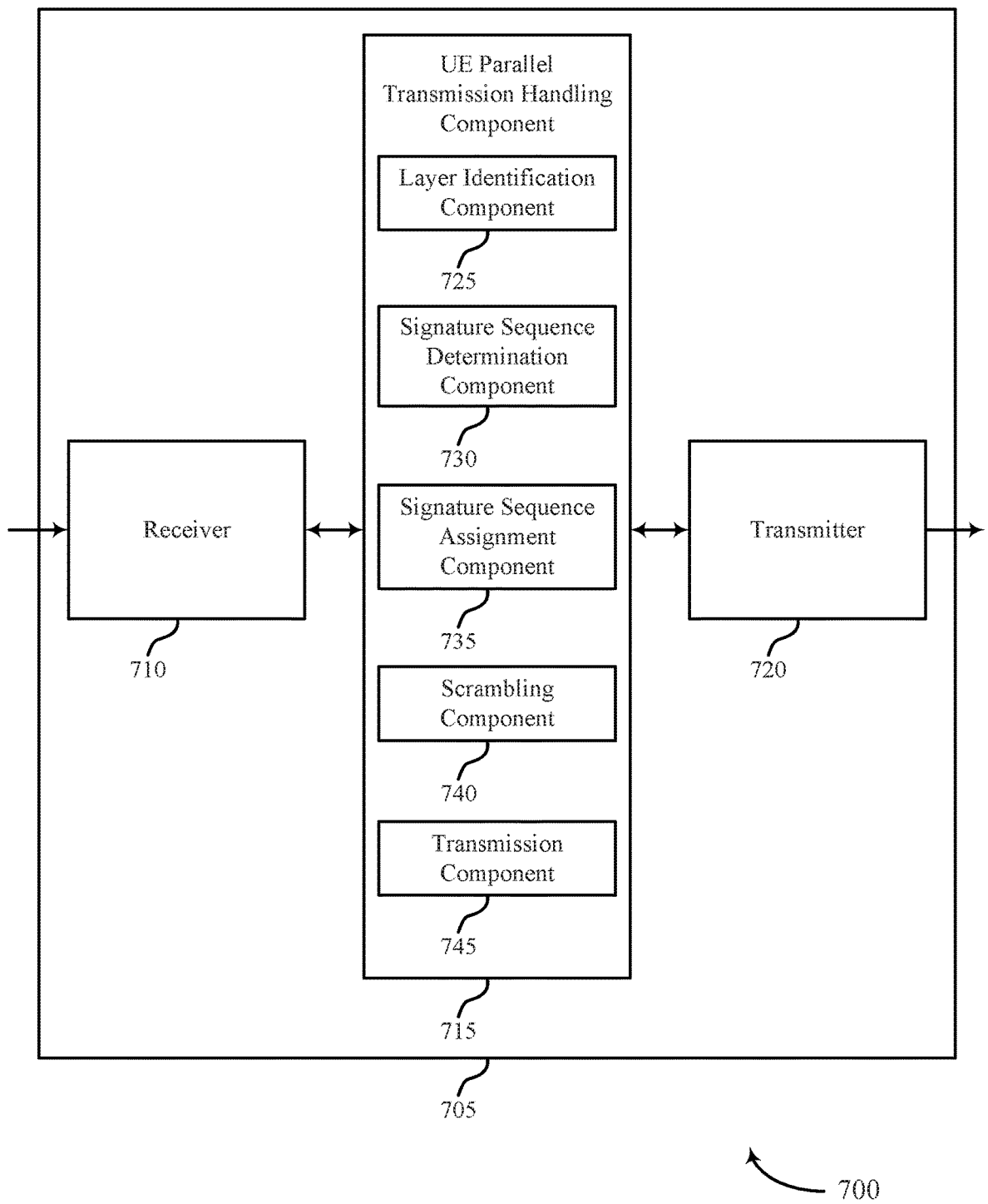

FIG. 7 shows a block diagram 700 of a wireless device 705 that supports parallel transmission of preamble sequences with data layers for improved data detection in accordance with aspects of the present disclosure. Wireless device 705 may be an example of aspects of a wireless device 605 or a UE 115 as described with reference to FIGS. 1 through 6. Wireless device 705 may include receiver 710, UE parallel transmission handling component 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to parallel transmission of preamble sequences with data layers for improved data detection). Information may be passed on to other components of the device. The receiver 710 may be an example of aspects of the transceiver 935 described with reference to FIG. 9. The receiver 710 may utilize a single antenna or a set of antennas.

UE parallel transmission handling component 715 may be an example of aspects of the UE parallel transmission handling component 615, 815, or 915 described with reference to FIGS. 6, 8, and 9. UE parallel transmission handling component 715 may also include layer identification component 725, signature sequence determination component 730, signature sequence assignment component 735, scrambling component 740, and transmission component 745.

Layer identification component 725 may identify one or more data layers and one or more preamble layers for transmission. Signature sequence determination component 730 may determine a set of signature sequences for scrambling the one or more data layers and the one or more preamble layers. Signature sequence assignment component 735 may assign each signature sequence of the set of signature sequences to a data layer of the one or more data layers or a preamble layer of the one or more preamble layers based on a cross-correlation metric of the each signature sequence. Scrambling component 740 may scramble the one or more data layers and the one or more preamble layers into a shared signal using the assigned each signature sequence. Transmission component 745 may transmit the shared signal.

Transmitter 720 may transmit signals generated by other components of the device. In some examples, the transmitter 720 may be collocated with a receiver 710 in a transceiver component. For example, the transmitter 720 may be an example of aspects of the transceiver 935 described with reference to FIG. 9. The transmitter 720 may utilize a single antenna or a set of antennas.

Figure 8:
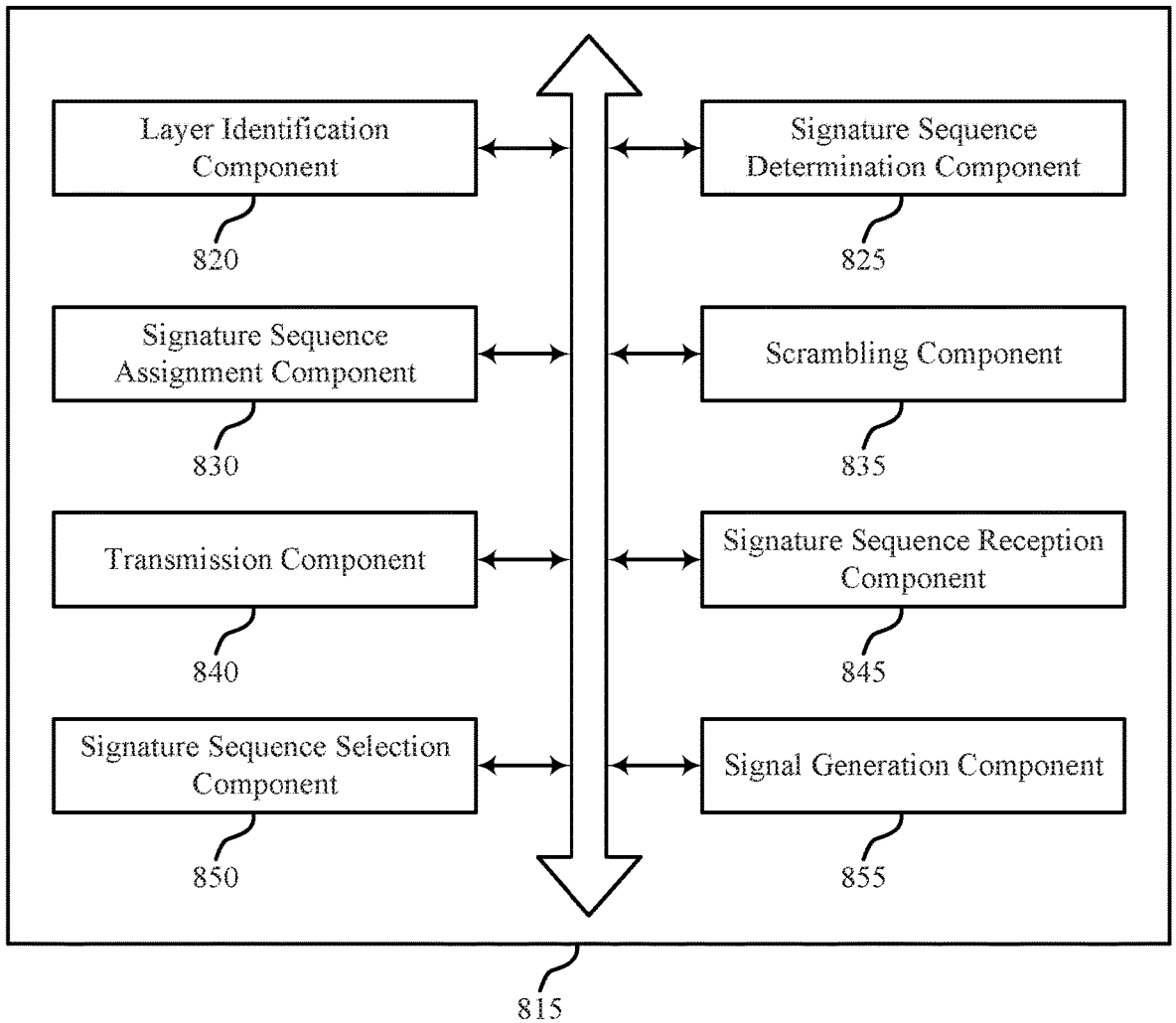

FIG. 8 shows a block diagram 800 of a UE parallel transmission handling component 815 that supports parallel transmission of preamble sequences with data layers for improved data detection in accordance with aspects of the present disclosure. The UE parallel transmission handling component 815 may be an example of aspects of a UE parallel transmission handling component 615, 715, or 915 described with reference to FIGS. 6, 7, and 9. The UE parallel transmission handling component 815 may include layer identification component 820, signature sequence determination component 825, signature sequence assignment component 830, scrambling component 835, transmission component 840, signature sequence reception component 845, signature sequence selection component 850, and signal generation component 855. Each of these components may communicate, directly or indirectly, with one another (e.g., via one or more buses).

Layer identification component 820 may identify one or more data layers and one or more preamble layers for transmission. In some cases, a preamble of the one or more preamble layers includes a default value, a pre-determined sequence, a pseudo-random sequence, or a combination thereof.

Signature sequence determination component 825 may determine a set of signature sequences for scrambling the one or more data layers and the one or more preamble layers. In some cases, the set of signature sequences includes orthogonal signature sequences, non-orthogonal signature sequences, or a combination thereof.

Signature sequence assignment component 830 may assign each signature sequence of the set of signature sequences to a data layer of the one or more data layers or a preamble layer of the one or more preamble layers based on a cross-correlation metric of the each signature sequence. In some cases, assigning the each signature sequence of the set of signature sequences to the data layer of the one or more data layers or the preamble layer of the one or more preamble layers further includes signature sequence assignment component 830 assigning a first set of signature sequences of the set of signature sequences to the one or more data layers, the first set of signature sequences corresponding to cross-correlation values that are lower than cross-correlation values of a second set of signature sequences of the set of signature sequences. Signature sequence assignment component 830 may additionally assign the second set of signature sequences to the one or more preamble layers.

Scrambling component 835 may scramble the one or more data layers and the one or more preamble layers into a shared signal using the assigned each signature sequence.

Transmission component 840 may transmit the shared signal. In some cases, transmission component 840 may additionally transmit one or more DMRSs prior to transmitting the shared signal, where the one or more DMRSs include information for detecting the shared signal. In other cases, the shared signal may be an example of a self-decodable signal. In some cases, transmitting the shared signal includes transmitting the shared signal using a DFT-s-OFDM waveform, a CP-OFDM waveform, or a combination thereof. In some cases, the shared signal is an example of a NOMA signal.

Signature sequence reception component 845 may receive a signature sequence allocation message from a base station, where the set of signature sequences is determined according to the signature sequence allocation message.

Signature sequence selection component 850 may select the set of signature sequences from a signature sequence pool, where the set of signature sequences is determined according to the selecting. In some cases, selecting the set of signature sequences from the signature sequence pool is based on a pseudo-random selection procedure.

In some cases, signal generation component 855 may assign different modulation schemes, channel coding schemes, power allocations, or a combination thereof to the one or more data layers, the one or more preamble layers, or a combination thereof. For example, signal generation component 855 may dynamically configure the modulation schemes, channel coding schemes, power allocations, or the combination thereof each layer of the one or more data layers, the one or more preamble layers, or the combination thereof, where assigning the different modulation schemes, the channel coding schemes, the power allocations, or the combination thereof is based on the dynamic configuration. In other cases, signal generation component 855 may assign a same modulation scheme, channel coding scheme, power allocation, or a combination thereof to the one or more data layers, the one or more preamble layers, or a combination thereof.

Figure 9:
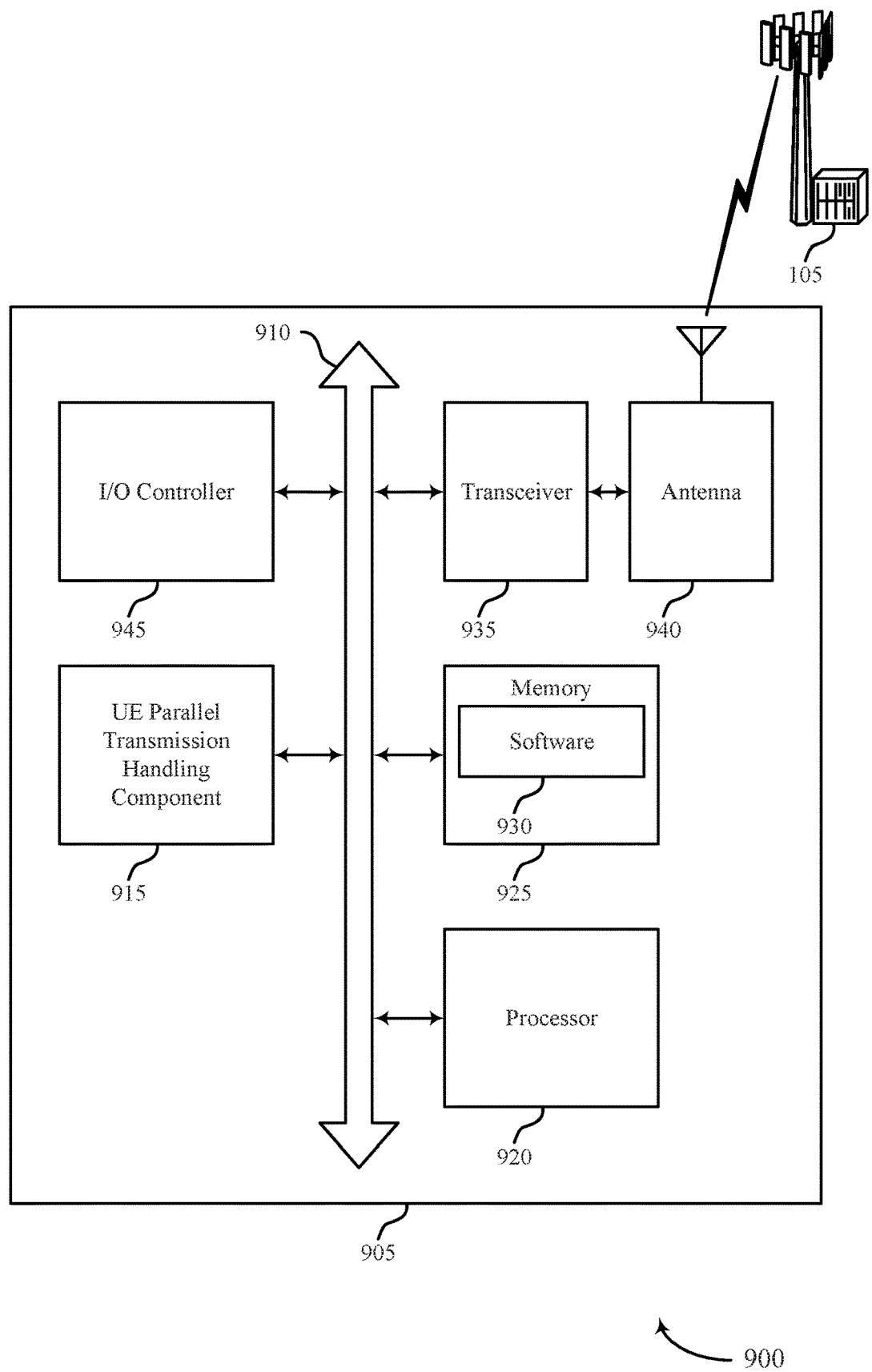
FIG. 9 illustrates a block diagram of a system including a user equipment (UE) that supports parallel transmission of preamble sequences with data layers for improved data detection in accordance with aspects of the present disclosure.

FIG. 9 shows a diagram of a system 900 including a device 905 that supports parallel transmission of preamble sequences with data layers for improved data detection in accordance with aspects of the present disclosure. Device 905 may be an example of or include the components of wireless device 605, wireless device 705, or a UE 115 as described above, e.g., with reference to FIGS. 1 through 7. Device 905 may include components for bi-directional voice and data communications including components for transmitting and receiving communications, including UE parallel transmission handling component 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting parallel transmission of preamble sequences with data layers for improved data detection).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support parallel transmission of preamble sequences with data layers for improved data detection. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
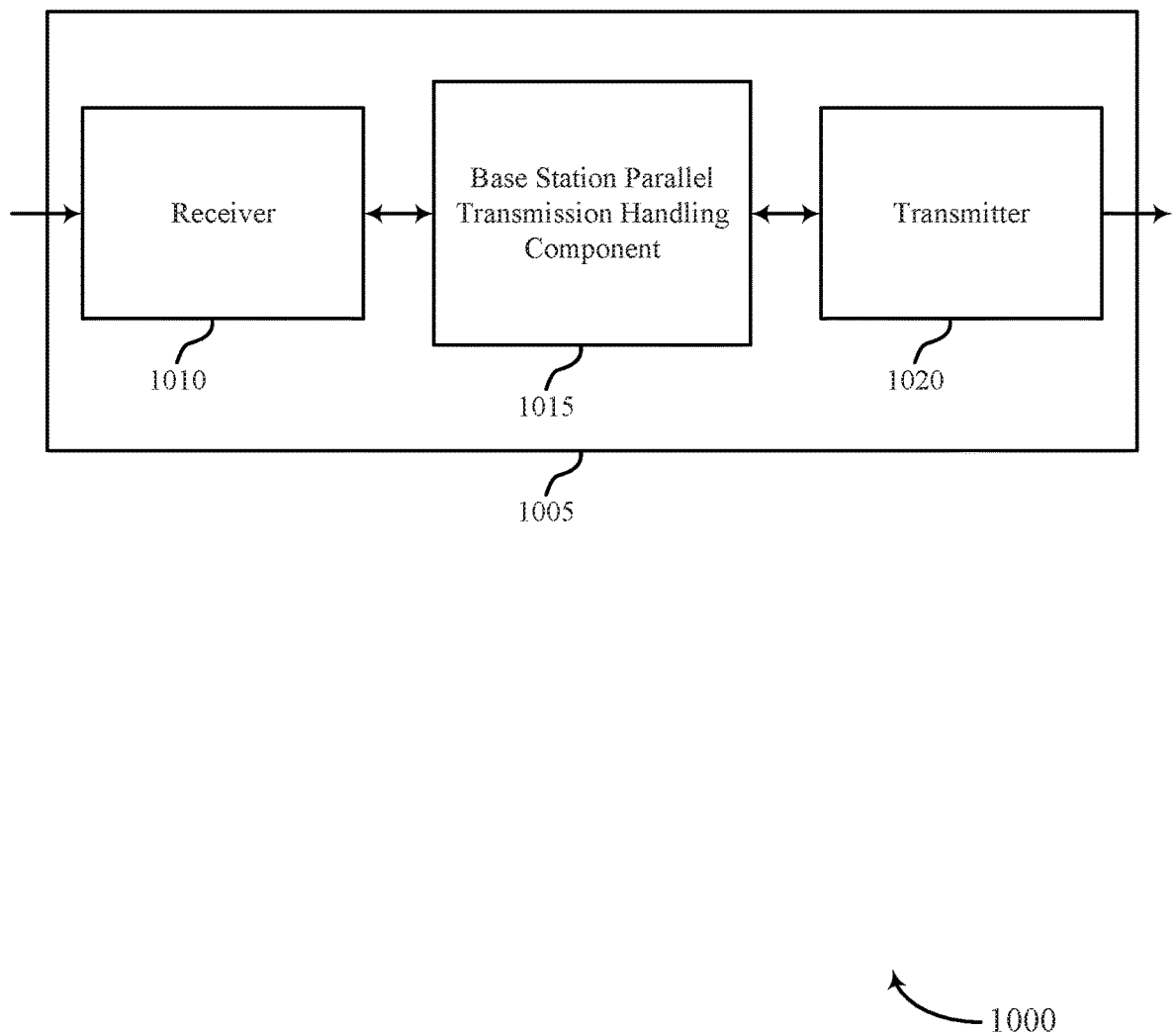
FIGS. 10 through 12 show block diagrams of a device that supports parallel transmission of preamble sequences with data layers for improved data detection in accordance with aspects of the present disclosure.

FIG. 10 shows a block diagram 1000 of a wireless device 1005 that supports parallel transmission of preamble sequences with data layers for improved data detection in accordance with aspects of the present disclosure. Wireless device 1005 may be an example of aspects of a base station 105 as described herein. Wireless device 1005 may include receiver 1010, base station parallel transmission handling component 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to parallel transmission of preamble sequences with data layers for improved data detection). Information may be passed on to other components of the device. The receiver 1010 may be an example of aspects of the transceiver 1335 described with reference to FIG. 13. The receiver 1010 may utilize a single antenna or a set of antennas.

Base station parallel transmission handling component 1015 may be an example of aspects of the base station parallel transmission handling component 1115, 1215, or 1315 described with reference to FIGS. 11 through 13.

Base station parallel transmission handling component 1015 and/or at least some of its various sub-components may be implemented in hardware, software executed by a processor, firmware, or any combination thereof. If implemented in software executed by a processor, the functions of the base station parallel transmission handling component 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station parallel transmission handling component 1015 and/or at least some of its various sub-components may be physically located at various positions, including being distributed such that portions of functions are implemented at different physical locations by one or more physical devices. In some examples, base station parallel transmission handling component 1015 and/or at least some of its various sub-components may be a separate and distinct component in accordance with various aspects of the present disclosure. In other examples, base station parallel transmission handling component 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station parallel transmission handling component 1015 may receive a candidate signal from a UE, determine one or more preamble layers scrambled in the candidate signal, and decode one or more data layers scrambled in the candidate signal based on the one or more preamble layers.

Transmitter 1020 may transmit signals generated by other components of the device. In some examples, the transmitter 1020 may be collocated with a receiver 1010 in a transceiver component. For example, the transmitter 1020 may be an example of aspects of the transceiver 1335 described with reference to FIG. 13. The transmitter 1020 may utilize a single antenna or a set of antennas.

Figure 11:
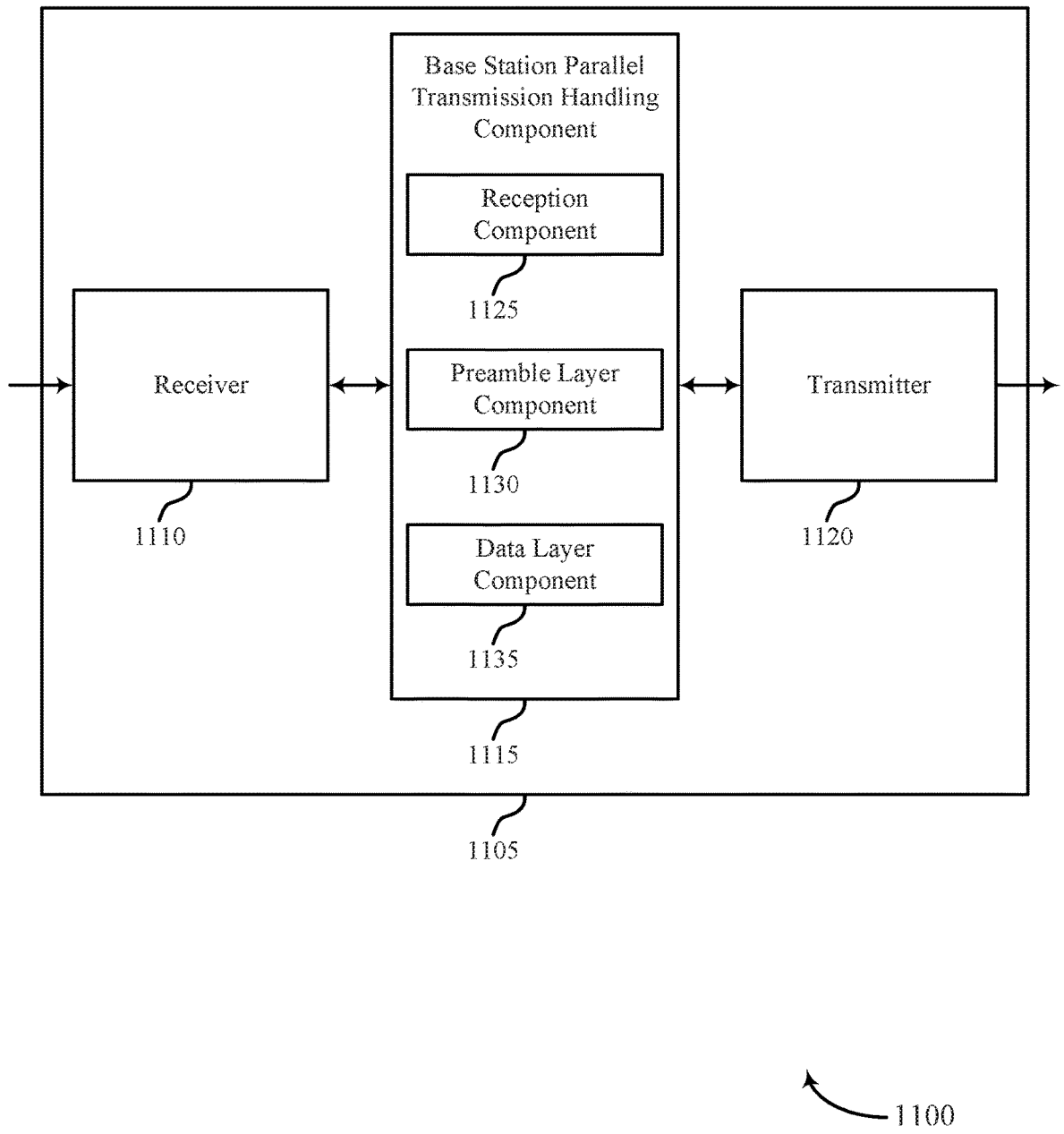

FIG. 11 shows a block diagram 1100 of a wireless device 1105 that supports parallel transmission of preamble sequences with data layers for improved data detection in accordance with aspects of the present disclosure. Wireless device 1105 may be an example of aspects of a wireless device 1005 or a base station 105 as described with reference to FIGS. 1 through 5 and 10. Wireless device 1105 may include receiver 1110, base station parallel transmission handling component 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to parallel transmission of preamble sequences with data layers for improved data detection). Information may be passed on to other components of the device. The receiver 1110 may be an example of aspects of the transceiver 1335 described with reference to FIG. 13. The receiver 1110 may utilize a single antenna or a set of antennas.

Base station parallel transmission handling component 1115 may be an example of aspects of the base station parallel transmission handling component 1015, 1215, or 1315 described with reference to FIGS. 10, 12, and 13. Base station parallel transmission handling component 1115 may also include reception component 1125, preamble layer component 1130, and data layer component 1135.

Reception component 1125 may receive a candidate signal from a UE. In some cases, the candidate signal is an example of a shared signal. Preamble layer component 1130 may determine one or more preamble layers scrambled in the candidate signal. Data layer component 1135 may decode one or more data layers scrambled in the candidate signal based on the one or more preamble layers.

Transmitter 1120 may transmit signals generated by other components of the device. In some examples, the transmitter 1120 may be collocated with a receiver 1110 in a transceiver component. For example, the transmitter 1120 may be an example of aspects of the transceiver 1335 described with reference to FIG. 13. The transmitter 1120 may utilize a single antenna or a set of antennas.

Figure 12:
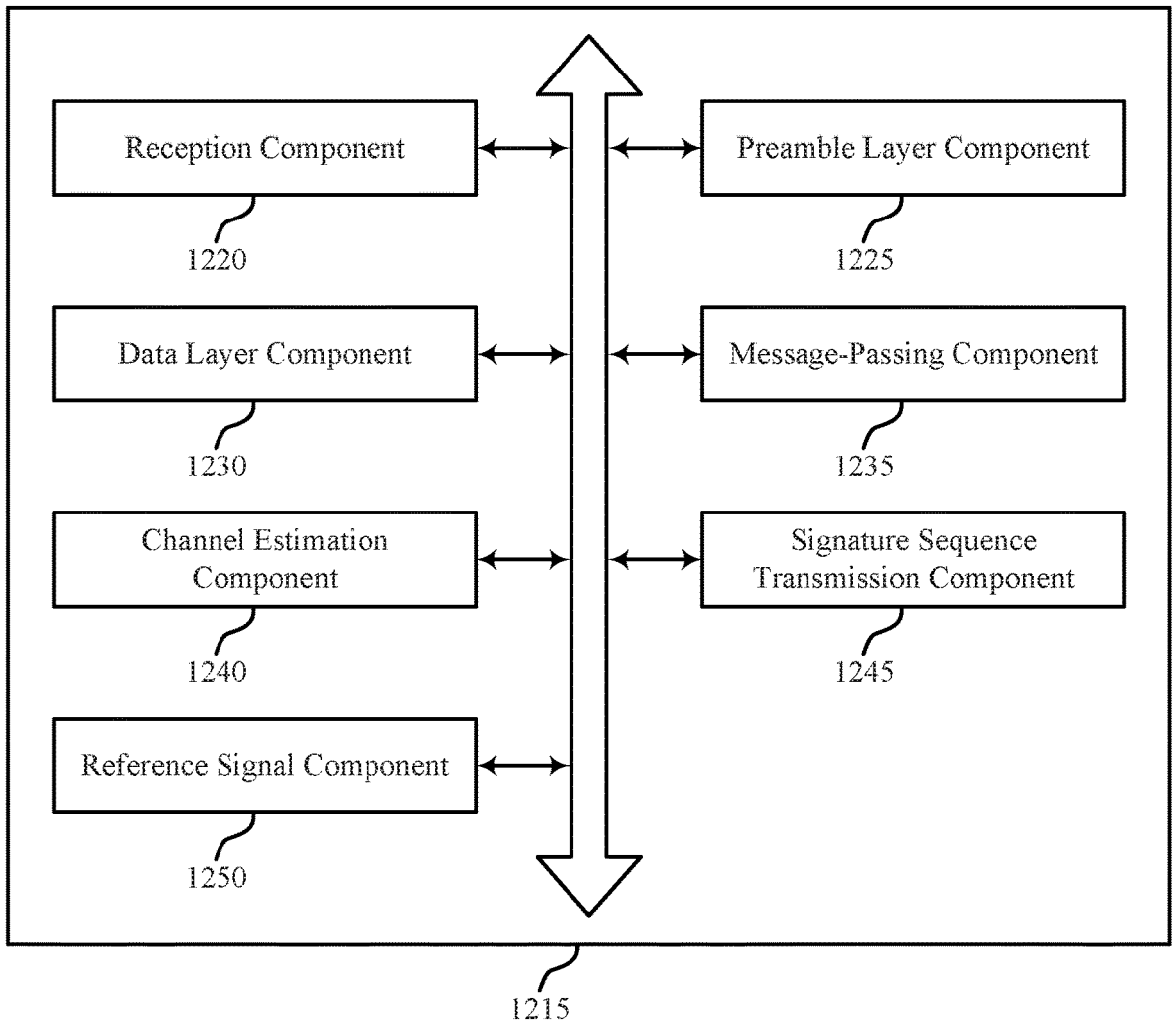

FIG. 12 shows a block diagram 1200 of a base station parallel transmission handling component 1215 that supports parallel transmission of preamble sequences with data layers for improved data detection in accordance with aspects of the present disclosure. The base station parallel transmission handling component 1215 may be an example of aspects of a base station parallel transmission handling component 1015, 1115, or 1315 described with reference to FIGS. 10, 11, and 13. The base station parallel transmission handling component 1215 may include reception component 1220, preamble layer component 1225, data layer component 1230, message-passing component 1235, channel estimation component 1240, signature sequence transmission component 1245, and reference signal component 1250. Each of these components may communicate, directly or indirectly, with one another (e.g., via one or more buses).

Reception component 1220 may receive a candidate signal from a UE. In some cases, the candidate signal is a self-decodable signal. In some cases, the candidate signal is an example of a NOMA signal. In some cases, the candidate signal is an example of a shared signal.

Preamble layer component 1225 may determine one or more preamble layers scrambled in the candidate signal. In some cases, preamble layer component 1225 may determine a set of signature sequences for detecting the one or more preamble layers, and may descramble the one or more preamble layers from the candidate signal based on the set of signature sequences, where determining the one or more preamble layers scrambled in the candidate signal is based on the descrambling.

Data layer component 1230 may decode one or more data layers scrambled in the candidate signal based on the one or more preamble layers. In some cases, data layer component 1230 may determine a set of signature sequences for detecting the one or more data layers, and may descramble the one or more data layers from the candidate signal based on the set of signature sequences, where decoding the one or more data layers scrambled in the candidate signal is based on the descrambling.

Message-passing component 1235 may jointly decoding the one or more preamble layers with the one or more data layers. In some cases, decoding the one or more data layers may include message-passing component 1235 performing a message-passing procedure, where the one or more preamble layers are used as prior information for the message-passing procedure.

Channel estimation component 1240 may perform channel estimation for the candidate signal based on the one or more preamble layers, where the one or more data layers are decoded based on the channel estimation. In some cases, performing the channel estimation for the candidate signal includes comparing the one or more preamble layers to one or more expected preamble values. In some cases, a preamble value of the one or more expected preamble values includes a default value, a pre-determined sequence, a pseudo-random sequence, or a combination thereof.

Signature sequence transmission component 1245 may transmit a signature sequence allocation message to the UE, where the candidate signal received from the UE is based on the signature sequence allocation message. In some cases, signature sequence transmission component 1245 may determine a set of signature sequences, where the signature sequence allocation message indicates the set of signature sequences and where determining the one or more preamble layers scrambled in the candidate signal is based on the set of signature sequences.

Reference signal component 1250 may receive one or more DMRSs for the candidate signal, and may perform channel estimation for the candidate signal based on the one or more DMRSs, where the one or more data layers are decoded based on the channel estimation.

Figure 13:
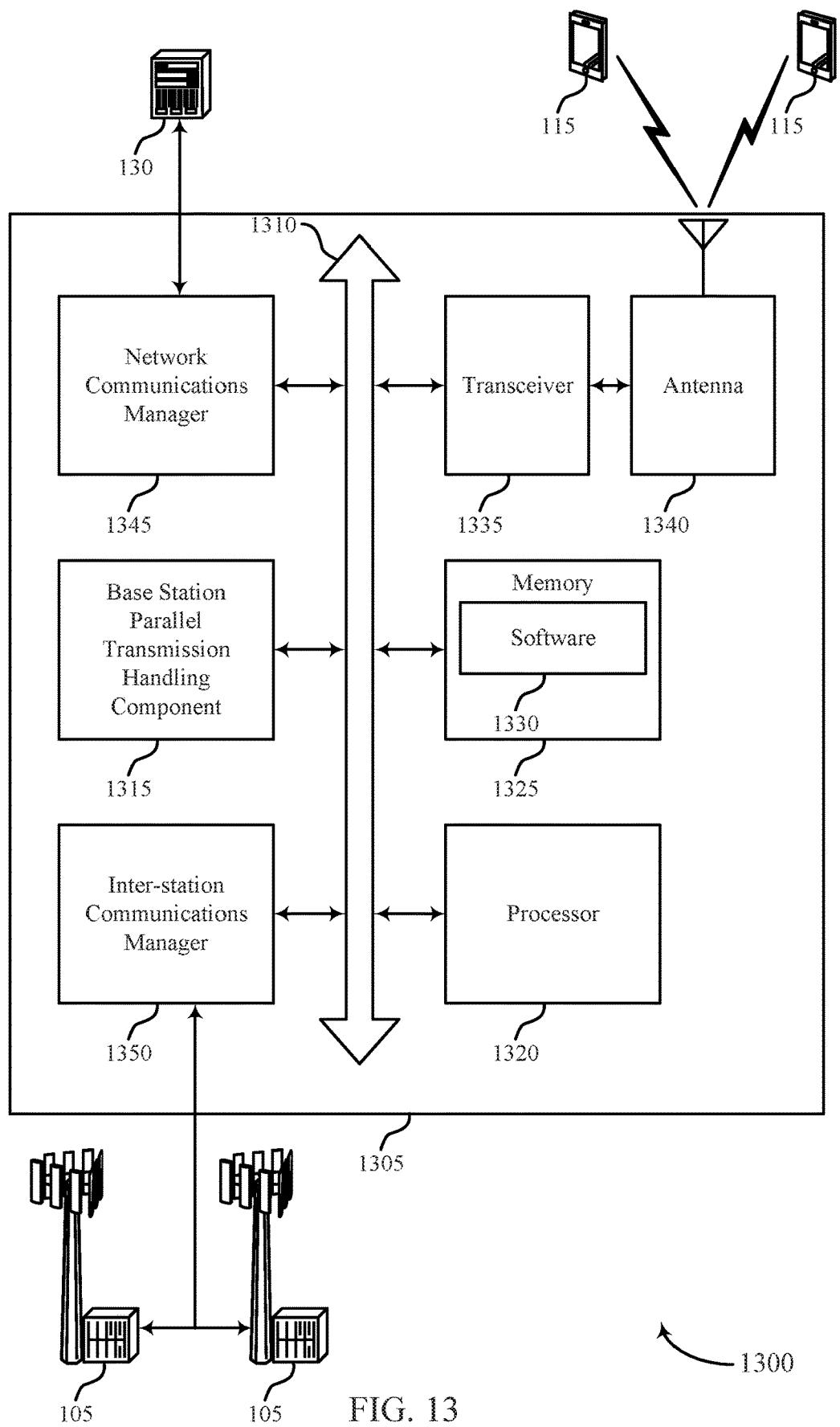
FIG. 13 illustrates a block diagram of a system including a base station that supports parallel transmission of preamble sequences with data layers for improved data detection in accordance with aspects of the present disclosure.

FIG. 13 shows a diagram of a system 1300 including a device 1305 that supports parallel transmission of preamble sequences with data layers for improved data detection in accordance with aspects of the present disclosure. Device 1305 may be an example of or include the components of wireless device 1005, wireless device 1105, or a base station 105 as described above, e.g., with reference to FIGS. 1 through 5, 10, and 11. Device 1305 may include components for bi-directional voice and data communications including components for transmitting and receiving communications, including base station parallel transmission handling component 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting parallel transmission of preamble sequences with data layers for improved data detection).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support parallel transmission of preamble sequences with data layers for improved data detection. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within a Long Term Evolution (LTE)/LTE-A wireless communication network technology to provide communication between base stations 105.

Figure 14:
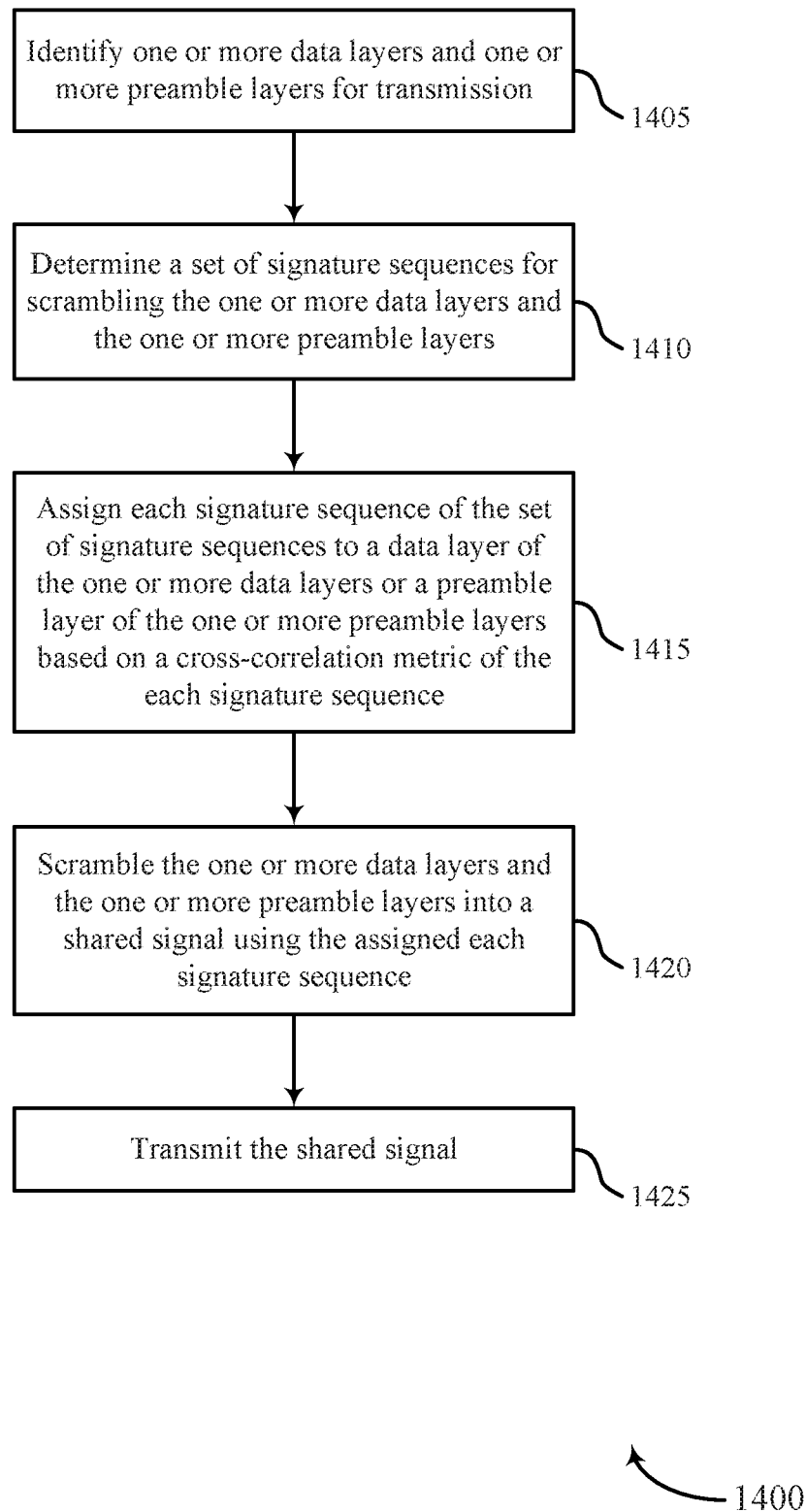
FIGS. 14 through 18 illustrate methods for parallel transmission of preamble sequences with data layers for improved data detection in accordance with aspects of the present disclosure.

FIG. 14 shows a flowchart illustrating a method 1400 for parallel transmission of preamble sequences with data layers for improved data detection in accordance with aspects of the present disclosure. The operations of method 1400 may be implemented by a UE 115 or its components as described herein. For example, the operations of method 1400 may be performed by a UE parallel transmission handling component as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may identify one or more data layers and one or more preamble layers for transmission. The operations of 1405 may be performed according to the methods described herein. In certain examples, aspects of the operations of 1405 may be performed by a layer identification component as described with reference to FIGS. 6 through 9.

At 1410 the UE 115 may determine a set of signature sequences for scrambling the one or more data layers and the one or more preamble layers. The operations of 1410 may be performed according to the methods described herein. In certain examples, aspects of the operations of 1410 may be performed by a signature sequence determination component as described with reference to FIGS. 6 through 9.

At 1415 the UE 115 may assign each signature sequence of the set of signature sequences to a data layer of the one or more data layers or a preamble layer of the one or more preamble layers based at least in part on a cross-correlation metric of the each signature sequence. The operations of 1415 may be performed according to the methods described herein. In certain examples, aspects of the operations of 1415 may be performed by a signature sequence assignment component as described with reference to FIGS. 6 through 9.

At 1420 the UE 115 may scramble the one or more data layers and the one or more preamble layers into a shared signal using the assigned each signature sequence. The operations of 1420 may be performed according to the methods described herein. In certain examples, aspects of the operations of 1420 may be performed by a scrambling component as described with reference to FIGS. 6 through 9.

At 1425 the UE 115 may transmit the shared signal. The operations of 1425 may be performed according to the methods described herein. In certain examples, aspects of the operations of 1425 may be performed by a transmission component as described with reference to FIGS. 6 through 9.

Figure 15:
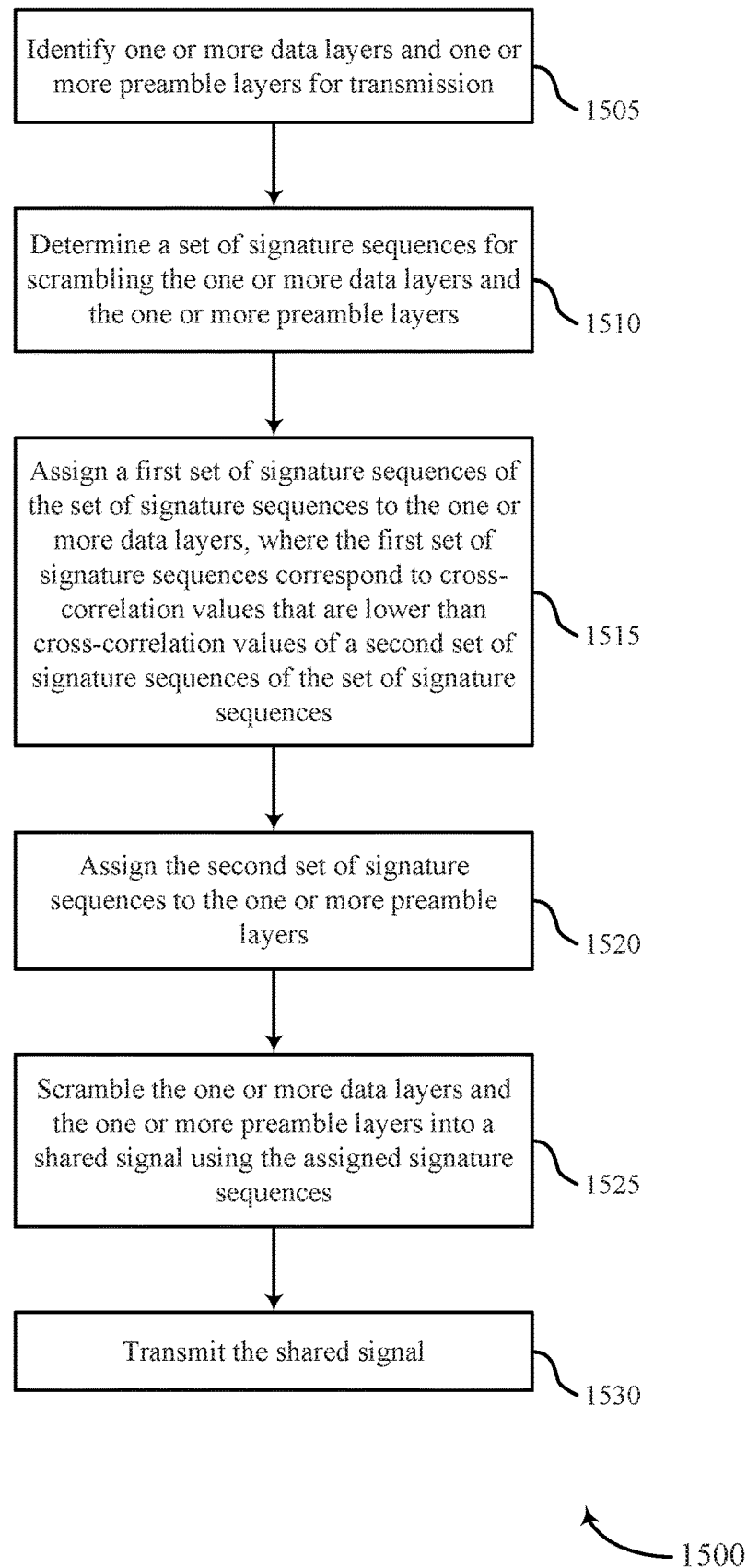

FIG. 15 shows a flowchart illustrating a method 1500 for parallel transmission of preamble sequences with data layers for improved data detection in accordance with aspects of the present disclosure. The operations of method 1500 may be implemented by a UE 115 or its components as described herein. For example, the operations of method 1500 may be performed by a UE parallel transmission handling component as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may identify one or more data layers and one or more preamble layers for transmission. The operations of 1505 may be performed according to the methods described herein. In certain examples, aspects of the operations of 1505 may be performed by a layer identification component as described with reference to FIGS. 6 through 9.

At 1510 the UE 115 may determine a set of signature sequences for scrambling the one or more data layers and the one or more preamble layers. The operations of 1510 may be performed according to the methods described herein. In certain examples, aspects of the operations of 1510 may be performed by a signature sequence determination component as described with reference to FIGS. 6 through 9.

At 1515 and 1520 the UE 115 may assign each signature sequence of the set of signature sequences to a data layer of the one or more data layers or a preamble layer of the one or more preamble layers based at least in part on a cross-correlation metric of the each signature sequence. For example, at 1515, the UE 115 may assign a first set of signature sequences of the set of signature sequences to the one or more data layers, the first set of signature sequences corresponding to cross-correlation values that are lower than cross-correlation values of a second set of signature sequences of the set of signature sequences. The operations of 1515 may be performed according to the methods described herein. In certain examples, aspects of the operations of 1515 may be performed by a signature sequence assignment component as described with reference to FIGS. 6 through 9. At 1520 the UE 115 may assign the second set of signature sequences to the one or more preamble layers. The operations of 1520 may be performed according to the methods described herein. In certain examples, aspects of the operations of 1520 may be performed by a signature sequence assignment component as described with reference to FIGS. 6 through 9.

At 1525 the UE 115 may scramble the one or more data layers and the one or more preamble layers into a shared signal using the assigned each signature sequence. The operations of 1525 may be performed according to the methods described herein. In certain examples, aspects of the operations of 1525 may be performed by a scrambling component as described with reference to FIGS. 6 through 9.

At 1530 the UE 115 may transmit the shared signal. The operations of 1530 may be performed according to the methods described herein. In certain examples, aspects of the operations of 1530 may be performed by a transmission component as described with reference to FIGS. 6 through 9.

Figure 16:
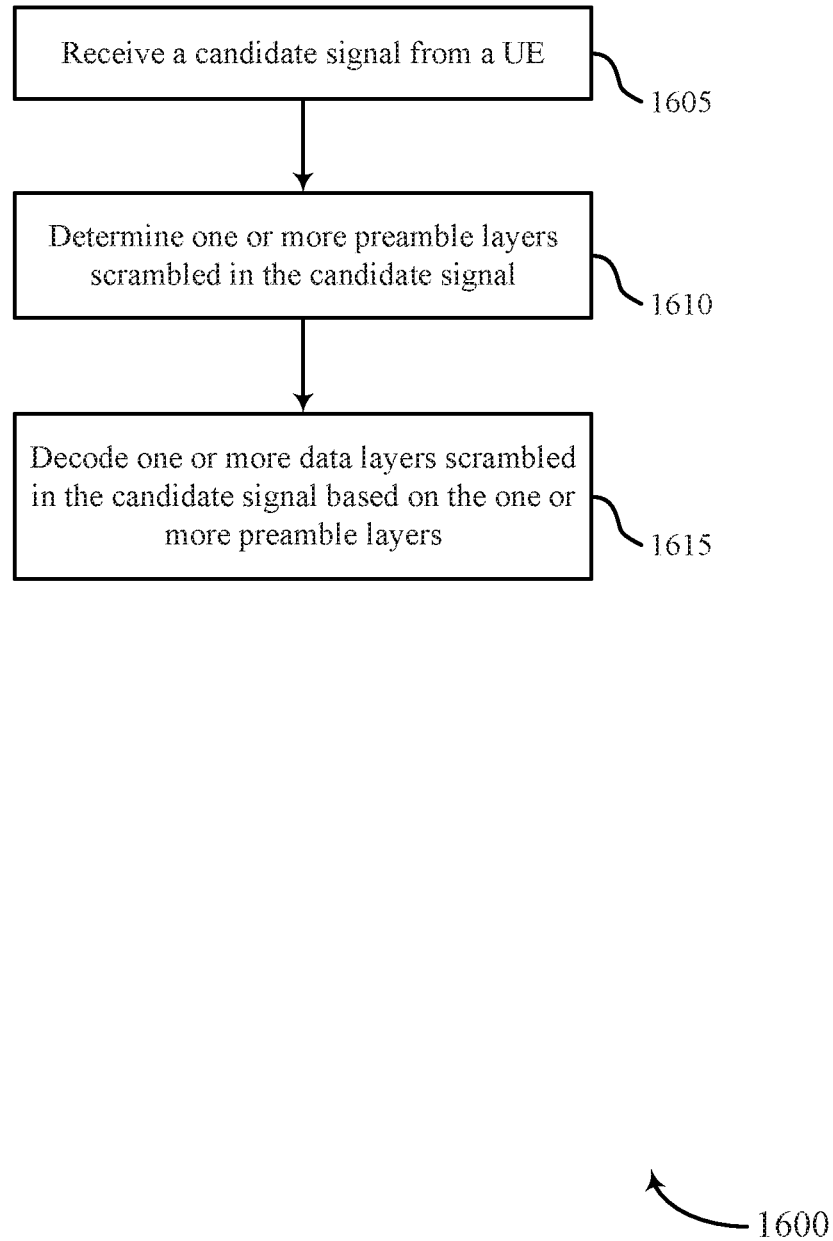

FIG. 16 shows a flowchart illustrating a method 1600 for parallel transmission of preamble sequences with data layers for improved data detection in accordance with aspects of the present disclosure. The operations of method 1600 may be implemented by a base station 105 or its components as described herein. For example, the operations of method 1600 may be performed by a base station parallel transmission handling component as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may receive a candidate signal from a UE 115. The operations of 1605 may be performed according to the methods described herein. In certain examples, aspects of the operations of 1605 may be performed by a reception component as described with reference to FIGS. 10 through 13.

At 1610 the base station 105 may determine one or more preamble layers scrambled in the candidate signal. The operations of 1610 may be performed according to the methods described herein. In certain examples, aspects of the operations of 1610 may be performed by a preamble layer component as described with reference to FIGS. 10 through 13.

At 1615 the base station 105 may decode one or more data layers scrambled in the candidate signal based at least in part on the one or more preamble layers. The operations of 1615 may be performed according to the methods described herein. In certain examples, aspects of the operations of 1615 may be performed by a data layer component as described with reference to FIGS. 10 through 13.

Figure 17:
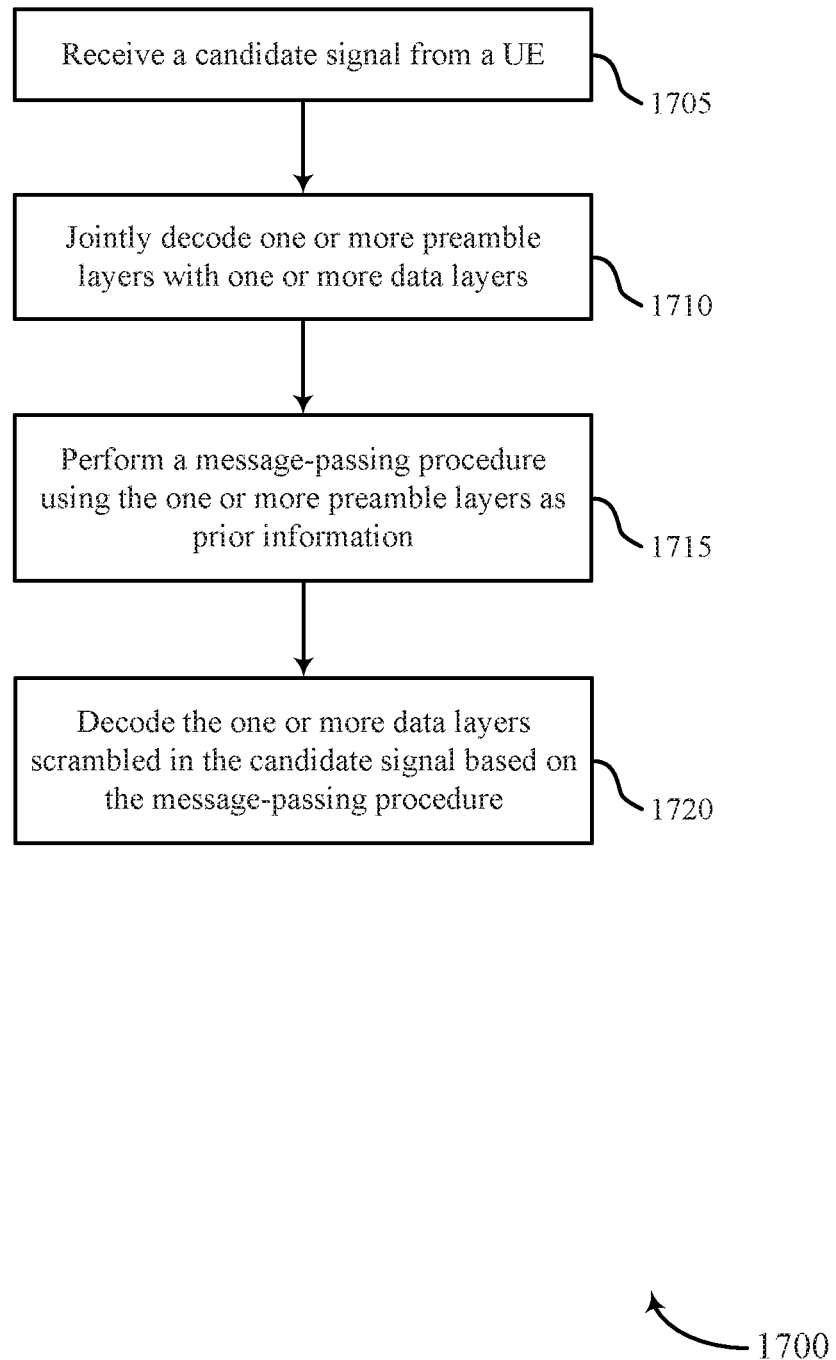

FIG. 17 shows a flowchart illustrating a method 1700 for parallel transmission of preamble sequences with data layers for improved data detection in accordance with aspects of the present disclosure. The operations of method 1700 may be implemented by a base station 105 or its components as described herein. For example, the operations of method 1700 may be performed by a base station parallel transmission handling component as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1705 the base station 105 may receive a candidate signal from a UE 115. The operations of 1705 may be performed according to the methods described herein. In certain examples, aspects of the operations of 1705 may be performed by a reception component as described with reference to FIGS. 10 through 13.

At 1710 the base station 105 may jointly decode one or more preamble layers with one or more data layers scrambled in the candidate signal. The operations of 1710 may be performed according to the methods described herein. In certain examples, aspects of the operations of 1710 may be performed by a message-passing component as described with reference to FIGS. 10 through 13.

At 1715 the base station 105 may perform a message-passing procedure, where the one or more preamble layers are used as prior information for the message-passing procedure. The operations of 1715 may be performed according to the methods described herein. In certain examples, aspects of the operations of 1715 may be performed by a message-passing component as described with reference to FIGS. 10 through 13.

At 1720 the base station 105 may decode one or more data layers scrambled in the candidate signal based at least in part on the message-passing procedure. The operations of 1720 may be performed according to the methods described herein. In certain examples, aspects of the operations of 1720 may be performed by a data layer component as described with reference to FIGS. 10 through 13.

Figure 18:
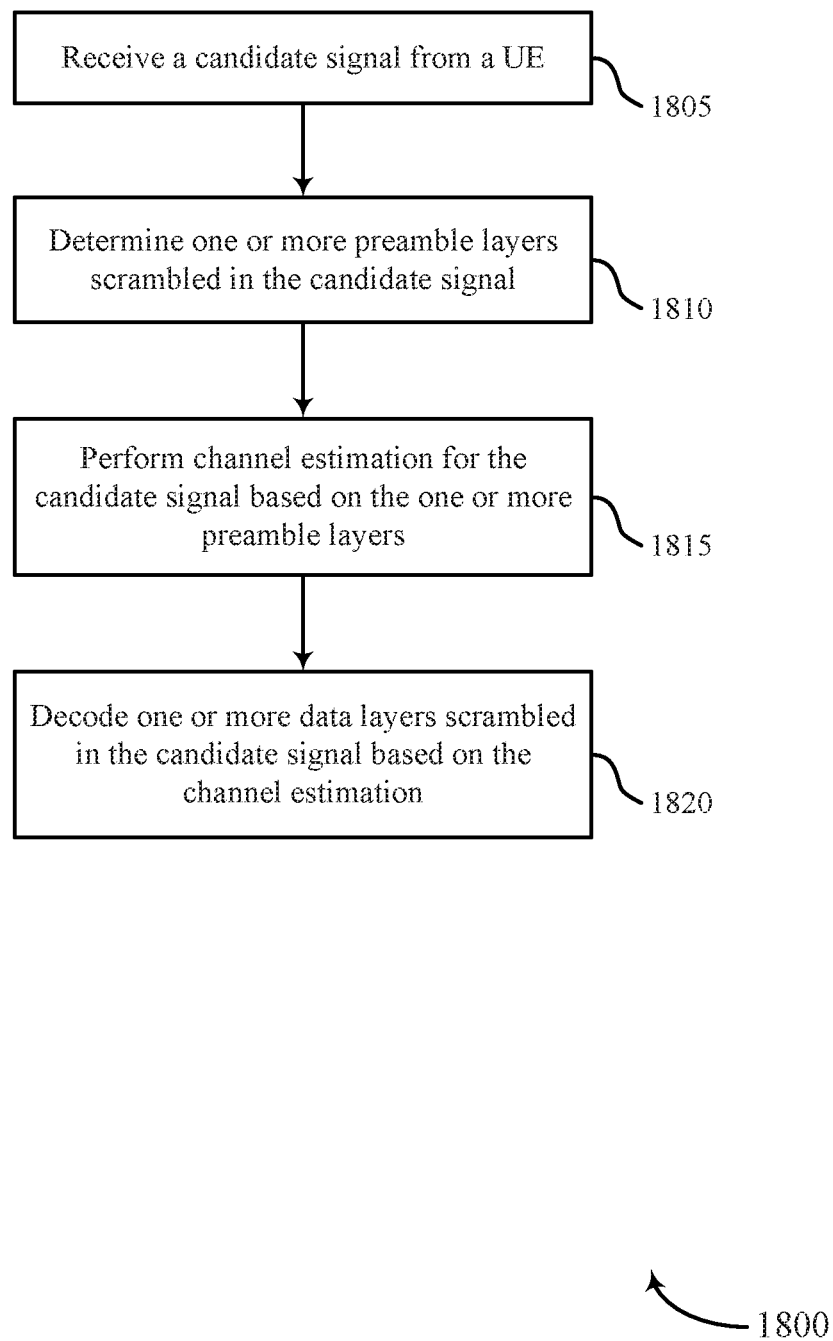

FIG. 18 shows a flowchart illustrating a method 1800 for parallel transmission of preamble sequences with data layers for improved data detection in accordance with aspects of the present disclosure. The operations of method 1800 may be implemented by a base station 105 or its components as described herein. For example, the operations of method 1800 may be performed by a base station parallel transmission handling component as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may receive a candidate signal from a UE 115. The operations of 1805 may be performed according to the methods described herein. In certain examples, aspects of the operations of 1805 may be performed by a reception component as described with reference to FIGS. 10 through 13.

At 1810 the base station 105 may determine one or more preamble layers scrambled in the candidate signal. The operations of 1810 may be performed according to the methods described herein. In certain examples, aspects of the operations of 1810 may be performed by a preamble layer component as described with reference to FIGS. 10 through 13.

At 1815 the base station 105 may perform channel estimation for the candidate signal based at least in part on the one or more preamble layers. The operations of 1815 may be performed according to the methods described herein. In certain examples, aspects of the operations of 1815 may be performed by a channel estimation component as described with reference to FIGS. 10 through 13.

At 1820 the base station 105 may decode one or more data layers scrambled in the candidate signal based at least in part on the channel estimation. The operations of 1820 may be performed according to the methods described herein. In certain examples, aspects of the operations of 1820 may be performed by a data layer component as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, UTRA, etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    determining a set of signature sequences for scrambling one or more data layers and one or more preamble layers for transmission;
    assigning each signature sequence of the set of signature sequences to a data layer of the one or more data layers or a preamble layer of the one or more preamble layers based at least in part on a cross-correlation metric of the each signature sequence, wherein the assigning comprises assigning a first set of signature sequences of the set of signature sequences to the one or more data layers and a second set of signature sequences of the set of signature sequences to the one or more preamble layers, and wherein the first set of signature sequences corresponds to cross-correlation values that are lower than cross-correlation values of the second set of signature sequences;
    scrambling the one or more data layers and the one or more preamble layers into a shared signal using the assigned each signature sequence; and
    transmitting the shared signal.

2. The method of claim 1, further comprising:
    receiving a signature sequence allocation message from a network entity, wherein the set of signature sequences is determined according to the signature sequence allocation message.

3. The method of claim 1, further comprising:
    selecting the set of signature sequences from a signature sequence pool, wherein the set of signature sequences is determined according to the selecting.

4. The method of claim 3, wherein selecting the set of signature sequences from the signature sequence pool is based at least in part on a pseudo-random selection procedure.

5. The method of claim 1, further comprising:
    assigning different modulation schemes, channel coding schemes, power allocations, or a combination thereof to the one or more data layers, the one or more preamble layers, or a combination thereof.

6. The method of claim 5, further comprising:
    dynamically configuring the modulation schemes, channel coding schemes, power allocations, or the combination thereof for each layer of the one or more data layers, the one or more preamble layers, or the combination thereof, wherein assigning the different modulation schemes, the channel coding schemes, the power allocations, or the combination thereof is based at least in part on the dynamic configuration.

7. The method of claim 1, further comprising:
assigning a same modulation scheme, channel coding scheme, power allocation, or a combination thereof to the one or more data layers, the one or more preamble layers, or a combination thereof.

8. The method of claim 1, wherein transmitting the shared signal comprises:
transmitting the shared signal using a Discrete Fourier Transform-spread-orthogonal frequency division multiplexing (DFT-s-OFDM) waveform, a cyclic prefix-orthogonal frequency division multiplexing (CP-OFDM) waveform, or a combination thereof.

9. The method of claim 1, further comprising:
transmitting one or more demodulation reference signals (DMRSs) prior to transmitting the shared signal, wherein the one or more DMRSs comprise information for detecting the shared signal.

10. The method of claim 1, wherein the shared signal comprises a self-decodable signal.

11. The method of claim 1, wherein a preamble of the one or more preamble layers comprises a default value, a pre-determined sequence, a pseudo-random sequence, or a combination thereof.

12. The method of claim 1, wherein the set of signature sequences comprises orthogonal signature sequences, non-orthogonal signature sequences, or a combination thereof.

13. The method of claim 1, wherein the shared signal comprises a non-orthogonal multiple access (NOMA) signal.

14. An apparatus for wireless communications at a user equipment (UE), comprising:
a processor;
memory coupled with the processor; and
instructions stored in the memory and executable by the processor to cause the apparatus to:
determine a set of signature sequences for scrambling one or more data layers and one or more preamble layers for transmission;
assign each signature sequence of the set of signature sequences to a data layer of the one or more data layers or a preamble layer of the one or more preamble layers based at least in part on a cross-correlation metric of the each signature sequence, wherein the assigning comprises assigning a first set of signature sequences of the set of signature sequences to the one or more data layers and a second set of signature sequences of the set of signature sequences to the one or more preamble layers, and wherein the first set of signature sequences corresponds to cross-correlation values that are lower than cross-correlation values of the second set of signature sequences;
scramble the one or more data layers and the one or more preamble layers into a shared signal using the assigned each signature sequence; and
transmit the shared signal.

15. The apparatus of claim 14, wherein the instructions are further executable by the processor to cause the apparatus to:
receive a signature sequence allocation message from a network entity, wherein the set of signature sequences is determined according to the signature sequence allocation message.

16. The apparatus of claim 14, wherein the instructions are further executable by the processor to cause the apparatus to:
select the set of signature sequences from a signature sequence pool, wherein the set of signature sequences is determined according to the selecting.

17. The apparatus of claim 16, wherein selecting the set of signature sequences from the signature sequence pool is based at least in part on a pseudo-random selection procedure.

18. The apparatus of claim 14, wherein the instructions are further executable by the processor to cause the apparatus to:
assign different modulation schemes, channel coding schemes, power allocations, or a combination thereof to the one or more data layers, the one or more preamble layers, or a combination thereof.

19. The apparatus of claim 18, wherein the instructions are further executable by the processor to cause the apparatus to:
dynamically configure the modulation schemes, channel coding schemes, power allocations, or the combination thereof for each layer of the one or more data layers, the one or more preamble layers, or the combination thereof, wherein assigning the different modulation schemes, the channel coding schemes, the power allocations, or the combination thereof is based at least in part on the dynamic configuration.

20. The apparatus of claim 14, wherein the instructions are further executable by the processor to cause the apparatus to:
assign a same modulation scheme, channel coding scheme, power allocation, or a combination thereof to the one or more data layers, the one or more preamble layers, or a combination thereof.

21. The apparatus of claim 14, wherein the instructions to transmit the shared signal are executable by the processor to cause the apparatus to:
transmit the shared signal using a Discrete Fourier Transform-spread-orthogonal frequency division multiplexing (DFT-s-OFDM) waveform, a cyclic prefix-orthogonal frequency division multiplexing (CP-OFDM) waveform, or a combination thereof.

22. The apparatus of claim 14, wherein the instructions are further executable by the processor to cause the apparatus to:
transmit one or more demodulation reference signals (DMRSs) prior to transmitting the shared signal, wherein the one or more DMRSs comprise information for detecting the shared signal.

23. The apparatus of claim 14, wherein the shared signal comprises a self-decodable signal.

24. The apparatus of claim 14, wherein a preamble of the one or more preamble layers comprises a default value, a pre-determined sequence, a pseudo-random sequence, or a combination thereof.

25. The apparatus of claim 14, wherein the set of signature sequences comprises orthogonal signature sequences, non-orthogonal signature sequences, or a combination thereof.

26. The apparatus of claim 14, wherein the shared signal comprises a non-orthogonal multiple access (NOMA) signal.

27. An apparatus for wireless communications at a user equipment (UE), comprising:
means for determining a set of signature sequences for scrambling one or more data layers and one or more preamble layers for transmission;
means for assigning each signature sequence of the set of signature sequences to a data layer of the one or more data layers or a preamble layer of the one or more preamble layers based at least in part on a cross-correlation metric of the each signature sequence, wherein the assigning comprises assigning a first set of signature sequences of the set of signature sequences to the one or more data layers and a second set of signature sequences of the set of signature sequences to the one or more preamble layers, and wherein the first set of signature sequences corresponds to cross-correlation values that are lower than cross-correlation values of the second set of signature sequences;

means for scrambling the one or more data layers and the one or more preamble layers into a shared signal using the assigned each signature sequence; and means for transmitting the shared signal.

28. A non-transitory computer-readable medium storing code for wireless communications at a user equipment (UE), the code comprising instructions executable by a processor to:

determine a set of signature sequences for scrambling one or more data layers and one or more preamble layers for transmission;

assign each signature sequence of the set of signature sequences to a data layer of the one or more data layers or a preamble layer of the one or more preamble layers based at least in part on a cross-correlation metric of the each signature sequence, wherein the assigning comprises assigning a first set of signature sequences of the set of signature sequences to the one or more data layers and a second set of signature sequences of the set of signature sequences to the one or more preamble layers, and wherein the first set of signature sequences corresponds to cross-correlation values that are lower than cross-correlation values of the second set of signature sequences;

scramble the one or more data layers and the one or more preamble layers into a shared signal using the assigned each signature sequence; and transmit the shared signal.

* * * * *